US012668684B2

(12) United States Patent
Kwon et al.

(10) Patent No.: US 12,668,684 B2
(45) Date of Patent: Jun. 30, 2026

(54) DIP-FORMED ARTICLE COMPRISING A LAYER DERIVED FROM LATEX COMPOSITION FOR DIP-FORMING

(71) Applicants: LG CHEM, LTD., Seoul (KR); MIDORI ANZEN CO., LTD., Tokyo (JP)

(72) Inventors: Won Sang Kwon, Daejeon (KR); Seung Uk Yeu, Daejeon (KR); Jung Su Han, Daejeon (KR); Jung Eun Kim, Daejeon (KR); Myung Su Jang, Daejeon (KR); Norihide Enomoto, Tokyo (JP); Sayaka Hoshino, Tokyo (JP); Shoya Satake, Tokyo (JP); Yamato Takeuchi, Tokyo (JP)

(73) Assignees: LG CHEM, LTD., Seoul (KR); MIDORI ANZEN CO., LTD., Tokyo (JP)

( * ) Notice: Subject to any disclaimer, the term of this patent is extended or adjusted under 35 U.S.C. 154(b) by 812 days.

(21) Appl. No.: 17/787,922

(22) PCT Filed: Dec. 9, 2021

(86) PCT No.: PCT/KR2021/018683

§ 371 (c)(1),
(2) Date: Jun. 21, 2022

(87) PCT Pub. No.: WO2022/124833

PCT Pub. Date: Jun. 16, 2022

(65) Prior Publication Data

US 2023/0091367 A1 Mar. 23, 2023

(30) Foreign Application Priority Data

Dec. 11, 2020 (JP) ................................ 2020-205982
Nov. 24, 2021 (JP) ................................ 2021-190387

(51) Int. Cl.
*C08L 9/04* (2006.01)

(52) U.S. Cl.
CPC ..................................... *C08L 9/04* (2013.01)

(58) Field of Classification Search
CPC ......................................................... C08L 9/04
See application file for complete search history.

(56) References Cited

U.S. PATENT DOCUMENTS 11,873,391 B2 * 1/2024 Ha .......................... C08C 19/04
12,157,816 B2 * 12/2024 Oh ........................... C08L 9/04
(Continued)

FOREIGN PATENT DOCUMENTS

CN 110582534 A 12/2019
EP 3 556 785 A1 10/2019
(Continued)

OTHER PUBLICATIONS

Machine Translation of KR 2019006615 Description Section (Year: 2019).*

(Continued)

*Primary Examiner* — John M Cooney
*Assistant Examiner* — Adam J Berro
(74) *Attorney, Agent, or Firm* — Morgan, Lewis & Bockius LLP

(57) ABSTRACT

Disclosed is a dip-formed article comprising a layer derived from a latex composition for dip-forming, wherein the latex composition for dip-forming contains a carboxylic acid-modified nitrile-based copolymer latex, the carboxylic acid-modified nitrile-based copolymer latex contains a carboxylic acid-modified nitrile-based copolymer, and the dip-formed article has an elongation of more than 650% and satisfies the following Expressions 1 and 2,

[Expression 1]

$$k_1'+k_2'+k_3' \leq 9.3 \text{ N/mm} \quad (1)$$

(Continued)

[Expression 2]

$$0.55 \leq k_1'/(k_1'+k_2'+k_3') \quad (2)$$

wherein $k_1'$ is a value obtained by dividing an equilibrium coefficient $k_1$ by a thickness of a test piece, and $k_2'$ and $k_3'$ are values obtained by dividing viscous coefficients $k_2$ and $k_3$ by the thickness of the test piece, respectively.

6 Claims, 1 Drawing Sheet

(56) References Cited

U.S. PATENT DOCUMENTS

| | | | | |
|---|---|---|---|---|
| 12,157,817 | B2 * | 12/2024 | Han | B29C 41/003 |
| 12,173,158 | B2 * | 12/2024 | Kwon | C08L 9/04 |
| 2010/0152365 | A1 | 6/2010 | Han et al. | |
| 2020/0317893 | A1 | 10/2020 | Kim et al. | |
| 2021/0221966 | A1 * | 7/2021 | Enomoto | C08J 5/18 |
| 2023/0105669 | A1 | 4/2023 | Enomoto et al. | |

FOREIGN PATENT DOCUMENTS

| | | | |
|---|---|---|---|
| JP | 2001-040141 | A | 2/2001 |
| JP | WO2017/146239 | A1 | 8/2017 |
| JP | 2020-164875 | A | 10/2020 |
| JP | 2020-189984 | A | 11/2020 |
| KR | 2001-0049711 | A | 6/2001 |
| KR | 2013-0041908 | A | 4/2013 |
| KR | 2017-0060793 | A | 6/2017 |
| KR | 10-2018-0025673 | A | 3/2018 |
| KR | 10-2019-0066151 | A | 6/2019 |
| KR | 10-2019-0117552 | A | 10/2019 |
| KR | 2020-0040994 | A | 4/2020 |
| TW | 201938610 | A | 10/2019 |
| WO | 2017/146238 | A1 | 8/2017 |
| WO | 2019/102985 | A1 | 5/2019 |
| WO | 2019/194056 | A1 | 10/2019 |

OTHER PUBLICATIONS

EPO Translation of WO2019194056 Description Section (Year: 2019).*

Taiwanese Office Action dated Jul. 8, 2022, issued in corresponding Taiwanese Patent Application No. 110145939.

Taiwanese Search Report dated Jul. 8, 2022, issued in corresponding Taiwanese Patent Application No. 110145939.

International Search Report and Written Opinion issued in corresponding International Patent Application No. PCT/KR2021/018683, dated Mar. 17, 2022.

Office Action dated May 23, 2023, issued in corresponding Japanese Patent Application No. 2021-190387.

Database WPI, Week 201959, Thomson Scientific, London , GB; AN 2019-51271R/XP002809991,—& KR 20190066151 A (LG Chem Ltd) Jun. 13, 2019 (Jun. 13, 2019).

Extended European Search Report dated Aug. 29, 2023, issued in corresponding European Patent Application No. 21899326.9.

Office Action (with partial translation) dated Jun. 27, 2023, issued in corresponding Chinese Patent Application No. 202180007349.6.

* cited by examiner

【FIG. 1】
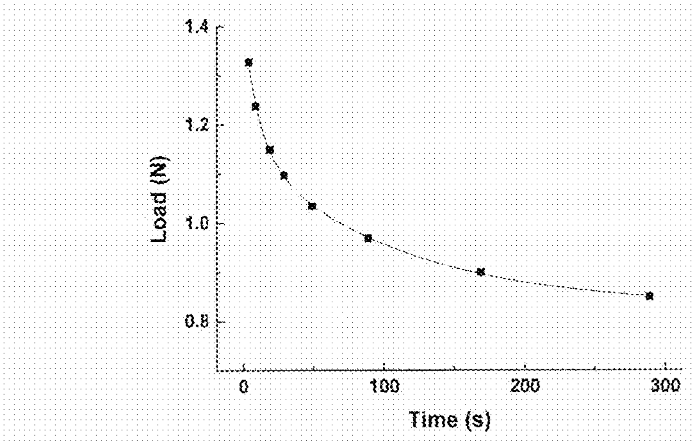
【FIG. 2】
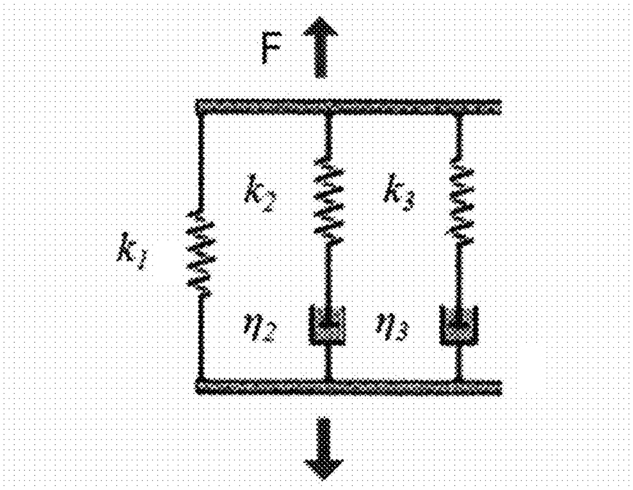

DIP-FORMED ARTICLE COMPRISING A LAYER DERIVED FROM LATEX COMPOSITION FOR DIP-FORMING

CROSS-REFERENCE TO RELATED APPLICATIONS

The present application claims the benefit of priorities to Japan Patent Application No. 2020-205982, filed on Dec. 11, 2020, and Japan Patent Application No. 2021-190387, filed on Nov. 24, 2021, the entire contents of which are incorporated herein by reference.

TECHNICAL FIELD

The present invention relates to a dip-formed article comprising a layer derived from a latex composition for dip-forming.

BACKGROUND ART

A natural rubber (NR) glove has a high stress retention rate, is easily stretched and soft, and has excellent so-called rubber elasticity. Therefore, the natural rubber glove is widely used as a surgical or general glove. However, since a protein contained in the natural rubber glove causes Type I allergic reactions, in particular, the surgical glove is used after removing the protein as much as possible.

Isoprene rubber (IR) or chloroprene rubber (CR), which is synthetic rubber, is used for the surgical glove because it has physical properties similar to those of natural rubber. The synthetic rubber glove does not cause Type I allergic reactions, but is complex to produce and expensive.

Meanwhile, carboxylated acrylonitrile butadiene rubber (XNBR), which is synthetic rubber, is widely used for a general glove because it is inexpensive. However, its physical properties are significantly different from those of natural rubber. While particles of natural rubber are large, particles of XNBR are small and covered with a surfactant, and finally, marks as though the respective particles are laminated remain, and a stress retention rate is extremely low. In addition, since physical properties of acrylonitrile are maintained, it is inferior to natural rubber in terms of stretching and softness.

An XNBR glove according to the related art is produced by intraparticle and interparticle crosslinking with sulfur and butadiene together with a vulcanization accelerator and interparticle ionic-crosslinking with carboxylic acid and zinc oxide so that the XNBR glove has a higher strength, but the XNBR glove causes Type IV allergic reactions due to the vulcanization accelerator, and has decreased stress retention, is not easily stretched, and becomes hard, due to the zinc oxide. In addition, since a glove which is thinner and has a higher strength is required, it is preferable to use a latex itself having less linear entanglement, which causes the latex to lose the original elasticity of rubber more and become a rubber like thermoplastic.

In addition, recently, in order to prevent the Type IV allergic reactions caused by the vulcanization accelerator in the XNBR glove, an accelerator free glove produced by self-crosslinking as a substitute for sulfur crosslinking and an organic crosslinking agent has been proposed. In particular, it is known that an epoxy-crosslinked glove of Patent Document 1, which is produced in place of a sulfur-crosslinked glove, has sufficient intraparticle crosslinking of XNBR.

Meanwhile, the interparticle crosslinking is commonly performed by crosslinking with zinc oxide in order to impart strength or stably produce a glove.

The zinc crosslinking is one of the causes of deterioration of stress retention, stretching, and softness of XNBR.

Therefore, the XNBR glove is not a glove that is similar to the NR glove required for a surgical glove, has a high stress retention rate, and is easily stretched and soft.

Patent Document 2 proposes an XNBR glove produced for a surgical glove. The XNBR glove is produced by crosslinking specific XNBR with aluminum, and when sterilized with γ-rays, which are essential for producing a surgical glove, the XNBR glove becomes partially hard and is not easily stretched, which is problematic in practicality.

In addition, aluminum crosslinking has been proposed as a substitute for crosslinking with sulfur and zinc oxide. Initially, the glove became too hard due to a high binding force of aluminum, and instability in a latex composition for dip-forming occurred. However, recently, improvements are proceeding.

Patent Document 3 proposes a crosslinking agent of a dihydroxy organoaluminum metal compound having two hydroxyl groups in one aluminum atom using an aluminum salt as a starting material.

Patent Document 4 proposes mixing a chelating agent or polyol with aluminate.

All of these are intended to solve the instability of the aluminum crosslinking agent described above, but the essential crosslinking function of the aluminum crosslinking agent is not fully understood.

RELATED ART DOCUMENTS

Patent Documents

Patent Document 1: International Patent Publication No. WO 2019/194056

Patent Document 2: International Patent Publication No. WO 2017/146238

Patent Document 3: Japanese Patent Laid-Open Publication No. 2010-209163

Patent Document 4: Japanese Patent Laid-Open Publication No. 2018-9272

DISCLOSURE

Technical Problem

In the standard ASTM D3577-19 of a surgical glove, a 500% modulus (stress when stretched by 500%) of 7 MPa or less, an elongation of 650% or more, and a tensile strength of 17 MPa or more are required. In the case of the XNBR glove, there is no actual product that satisfies these criteria.

In addition, SR (stress retention rate after 5 minutes when stretched by 100%), which means the original rubber elasticity of rubber, of the natural rubber glove is 75 to 85%, while that of the XNBR glove according to the related art is only about 35 to 45%.

An object of the present invention is to provide a dip-formed article that has an excellent stress retention rate, is easily stretched, and is formed of a latex composition for dip-forming that contains a carboxylic acid-modified nitrile-based copolymer latex containing a carboxylic acid-modified nitrile-based copolymer, for example, an XNBR glove that has an excellent stress retention rate and is easily stretched and soft.

In addition, as the best form, an object of the present invention is to produce an XNBR glove that satisfies the standard of a surgical glove and has SR of 55% or more, and improvements of latex itself that affect a viscosity and elasticity of the glove, a crosslinking agent, and achievement of effects by a combination are examined.

Technical Solution

The present invention provides the following:

(1) A dip-formed article comprising a layer derived from a latex composition for dip-forming, wherein the latex composition for dip-forming contains a carboxylic acid-modified nitrile-based copolymer latex, the carboxylic acid-modified nitrile-based copolymer latex contains a carboxylic acid-modified nitrile-based copolymer, and the dip-formed article has an elongation of more than 650% and satisfies the following Expressions 1 and 2,

[Math. 1]

[Expression 1]

$$k_1'+k_2'+k_3'\leq 9.3\text{ N/mm} \quad (1)$$

[Expression 2]

$$0.55\leq k_1'/(k_1'+k_2'+k_3') \quad (2)$$

wherein $k_1'$ is a value obtained by dividing an equilibrium coefficient $k_1$ by a thickness of a test piece, and $k_2'$ and $k_3'$ are values obtained by dividing viscous coefficients $k_2$ and $k_3$ by the thickness of the test piece, respectively;

(2) The dip-formed article described in (1), wherein the carboxylic acid-modified nitrile-based copolymer latex satisfies the following Expressions 3 and 4, and the carboxylic acid-modified nitrile-based copolymer includes, based on a dry weight of the carboxylic acid-modified nitrile-based copolymer, 18 to 28 wt % of an ethylenically unsaturated nitrile-based monomer-derived unit, 67.5 to 79.5 wt % of a conjugated diene-based monomer-derived unit, and 2.5 to 4.5 wt % of an ethylenically unsaturated acid monomer-derived unit,

[Math. 2]

[Expression 3]

$$1.0\leq CV_0\leq 3.0\text{ mm}^2/\text{s} \quad (3)$$

[Expression 4]

$$0.8\leq P\leq 1, P=CV_D/CV_0 \quad (4)$$

wherein $CV_0$ represents a capillary viscosity of the carboxylic acid-modified nitrile-based copolymer latex in a swollen state, and $CV_D$ represents a capillary viscosity of the carboxylic acid-modified nitrile-based copolymer latex in a de-swollen state;

(3) The dip-formed article described in (2), wherein the ethylenically unsaturated nitrile-based monomer-derived unit is acrylonitrile, the conjugated diene-based monomer-derived unit is 1,3-butadiene, and the ethylenically unsaturated acid monomer-derived unit is (meth)acrylic acid;

(4) The dip-formed article described in any one of (1) to (3), wherein the latex composition for dip-forming further contains an epoxy crosslinking agent, an aluminum crosslinking agent, water, and a pH adjuster;

(5) The dip-formed article described in (4), wherein the amount of the epoxy crosslinking agent added is 0.1 to 1.6 parts by weight based on 100 parts by weight of the carboxylic acid-modified nitrile-based copolymer, the amount of the aluminum crosslinking agent added is 0.1 to 0.8 parts by weight in terms of aluminum oxide based on 100 parts by weight of the carboxylic acid-modified nitrile-based copolymer, and when both the epoxy crosslinking agent and the aluminum crosslinking agent are added, a total amount of the epoxy crosslinking agent and aluminum crosslinking agent added is 0.2 to 1.6 parts by weight based on 100 parts by weight of the carboxylic acid-modified nitrile-based copolymer;

(6) The dip-formed article described in (4), wherein the amount of the epoxy crosslinking agent added is 0.2 to 1.0 part by weight based on 100 parts by weight of the carboxylic acid-modified nitrile-based copolymer, the amount of the aluminum crosslinking agent added is 0.2 to 0.7 parts by weight in terms of aluminum oxide based on 100 parts by weight of the carboxylic acid-modified nitrile-based copolymer, and when both the epoxy crosslinking agent and the aluminum crosslinking agent are added, a total amount of the epoxy crosslinking agent and aluminum crosslinking agent added is 0.4 to 1.4 parts by weight based on 100 parts by weight of the carboxylic acid-modified nitrile-based copolymer;

(7) The dip-formed article described in any one of (4) to (6), wherein the epoxy crosslinking agent has three or more glycidyl groups in one molecule, an alicyclic, aliphatic, or aromatic base skeleton, an average number of epoxy groups of more than 2.25, and an MIBK/water distribution ratio of 50% or more, and the aluminum crosslinking agent is aluminum carboxylate;

(8) A dip-formed article for surgery sterilized by irradiating the dip-formed article described in any one of (1) to (7) with γ-rays;

(9) A latex composition for dip-forming, containing at least a carboxylic acid-modified nitrile-based copolymer latex, an epoxy crosslinking agent, and an aluminum crosslinking agent, wherein the carboxylic acid-modified nitrile-based copolymer latex contains a carboxylic acid-modified nitrile-based copolymer, the carboxylic acid-modified nitrile-based copolymer includes, based on a total content of the carboxylic acid-modified nitrile-based copolymer, 67.5 to 79.5 wt % of a conjugated diene-based monomer-derived unit, 18 to 28 wt % of an ethylenically unsaturated nitrile-based monomer-derived unit, and 2.5 to 4.5 wt % of an ethylenically unsaturated acid monomer-derived unit, the carboxylic acid-modified nitrile-based copolymer latex satisfies the following Expressions 3 and 4,

[Math. 3]

[Expression 3]

$$1.0\leq CV_0\leq 3.0\text{ mm}^2/\text{s} \quad (3)$$

[Expression 4]

$$0.8\leq P\leq 1, P=CV_D/CV_0 \quad (4)$$

wherein $CV_0$ represents a capillary viscosity of the carboxylic acid-modified nitrile-based copolymer latex in a swollen state, and $CV_D$ represents a capillary viscosity of the carboxylic acid-modified nitrile-based copolymer latex in a de-swollen state, the epoxy crosslinking agent has three or more glycidyl groups in one molecule, an alicyclic, aliphatic, Or aromatic base skeleton, an average number of epoxy groups of more than 2.25, and an MIBK/water distribution ratio of 50% or more, the amount of the epoxy crosslinking agent is 0.1 to 1.6 parts by weight based on 100 parts by weight of the carboxylic acid-modified nitrile-based copolymer, the aluminum crosslinking agent is aluminum carboxylate, and the amount of the aluminum crosslinking agent is 0.1 to 0.8 parts by weight based on 100 parts by weight of the carboxylic acid-modified nitrile-based copolymer, a total amount of the epoxy crosslinking agent and aluminum crosslinking agent added is 0.2 to 1.6 parts by weight based on the 100 parts by weight of the carboxylic acid-modified nitrile-based copolymer, and a pH of the latex composition for dip-forming is adjusted to 9.0 to 10.5 by a pH adjuster;

(10) A method for producing a dip-formed article, the method including:

(i) a maturation step of preparing and stirring the latex composition for dip-forming according to (9);

(ii) a dipping step of dipping a forming mold in the latex composition for dip-forming;

(iii) a gelling step of gelling a film formed on the forming mold;

(iv) a leaching step of removing impurities from the film formed on the forming mold;

(v) a beading step of making a roll in a cuff portion; and (vi) a curing step of heating and drying the film at a high temperature and finally completing crosslinking to obtain a cured film as a formed article; and

(11) A latex composition for dip-forming, containing at least the carboxylic acid-modified nitrile-based copolymer latex described in (2), an epoxy crosslinking agent, and an aluminum crosslinking agent.

Advantageous Effects

The present invention provides a dip-formed article formed of a carboxylic acid-modified nitrile-based copolymer that could not be produced with XNBR according to the related art, has an excellent stress retention rate, and is easily stretched. Specifically, the present invention provides a glove that is easily stretched and soft and has a high stress retention rate. In the best exemplary embodiment, a glove satisfying the standard of a surgical glove is provided. This is achieved by using XNBR that has appropriate contents of acrylonitrile and carboxylic acid, is prepared under particularly adjusted polymerization conditions, and is easily stretched and soft and crosslinking the XNBR by the epoxy crosslinking agent that sufficiently performs intraparticle crosslinking instead of sulfur and aluminum that performs interparticle crosslinking instead of zinc, according to the solution means of the present application. Furthermore, the glove of the present invention is characterized in that the physical properties are not changed and stable even by sterilization by γ-rays required for a surgical glove.

DESCRIPTION OF DRAWINGS

FIG. 1 is a graph showing a load by time based on the Maxwell-Weichert model.

FIG. 2 is a schematic view of the Maxwell-Weichert model.

BEST MODE

Hereinafter, preferred exemplary embodiments of the present invention will be described, but the present invention is not limited to these exemplary embodiments, and various modifications and alterations may be made. In addition, in the present specification, the term "weight" and the term "mass" have the same meanings and are thus hereinafter collectively stated as the "weight".

In addition, in the present specification, unless otherwise stated, "%" refers to "wt %", and "part(s)" refers to "part(s) by weight".

In addition, unless otherwise stated, "part(s) by weight" refers to the number of parts by weight based on 100 parts by weight of an elastomer in principle.

In addition, in the present specification, when "to" is used by inserting a numerical value or a physical property value before and after it, it is intended to include the values before and after it.

1. Technical Features of the Present Invention

A formed article according to an exemplary embodiment of the present invention has rubber elasticity similar to that of natural rubber, which has hitherto been considered impossible to be implemented by XNBR. That is, the formed article has an excellent stress retention rate, softness, and stretching. In addition, the formed article also has a tensile strength and fatigue durability required for a glove.

Furthermore, the present invention proposes a crosslinking model in which an epoxy crosslinking agent and an aluminum crosslinking agent are combined as a substitute for vulcanized zinc crosslinking according to the related art.

In addition, in the case of XNBR, a latex having unprecedented properties is used, in which a combination of the crosslinking agents described above is maximized.

Therefore, in the case of the formed article formed of XNBR, it is possible to obtain a glove having both high levels of elasticity and softness that are not compatible in the related art.

An action effect by the latex, the epoxy crosslinking agent, the aluminum crosslinking agent, and a combination thereof in the present invention will be described.

(1) Latex

A carboxylic acid-modified nitrile-based copolymer in a carboxylic acid-modified nitrile-based copolymer latex of the present invention may include a conjugated diene-based monomer-derived unit, an ethylenically unsaturated nitrile-based monomer-derived unit, and an ethylenically unsaturated acid monomer-derived unit.

The carboxylic acid-modified nitrile-based copolymer latex of the present invention is a carboxylic acid-modified nitrile-based copolymer latex containing a carboxylic acid-modified nitrile-based copolymer, wherein the carboxylic acid-modified nitrile-based copolymer includes, based on a dry weight of the copolymer, 18 to 28 wt % of an ethylenically unsaturated nitrile-based monomer-derived unit, 67.5 to 79.5 wt % of a conjugated diene-based monomer-derived unit, and 2.5 to 4.5 wt % of an ethylenically unsaturated acid monomer-derived unit, and the carboxylic acid-modified nitrile-based copolymer latex satisfies the following Expressions 3 and 4,

[Math. 4]

[Expression 3]

$$1.0 \leq CV_0 \leq 3.0 \text{ mm}^2/\text{s} \quad (3)$$

[Expression 4]

$$0.8 \leq P \leq 1, P = CV_D/CV_0 \quad (4)$$

wherein $CV_0$ represents a capillary viscosity of the carboxylic acid-modified nitrile-based copolymer latex in a swollen state, and $CV_D$ represents a capillary viscosity of the carboxylic acid-modified nitrile-based copolymer latex in a de-swollen state.

(i) Conjugated Diene-Based Monomer

According to an exemplary embodiment of the present invention, a conjugated diene-based monomer constituting the conjugated diene-based monomer-derived unit may be one or more selected from the group consisting of 1,3-butadiene, 2,3-dimethyl-1,3-butadiene, 2-ethyl-1,3-butadiene, 1,3-pentadiene, and isoprene. As a specific example, the conjugated diene-based monomer may be 1,3-butadiene or isoprene.

A content of the conjugated diene-based monomer-derived unit may be 67.5 wt % to 79.5 wt % based on the total content of the carboxylic acid-modified nitrile-based copolymer. Within this range, a formed article formed of a latex composition for dip-forming that contains the carboxylic acid-modified nitrile-based copolymer is soft and easily stretched and has improved rubber elasticity, as a content of the conjugated diene-based monomer is increased.

(ii) Ethylenically Unsaturated Nitrile-Based Monomer

According to an exemplary embodiment of the present invention, an ethylenically unsaturated nitrile-based monomer constituting the ethylenically unsaturated nitrile-based monomer-derived unit may be one or more selected from the group consisting of acrylonitrile, methacrylonitrile, fumaronitrile, α-chloronitrile, and α-cyanoethylacrylonitrile. As a specific example, the ethylenically unsaturated nitrile-based monomer may be acrylonitrile or methacrylonitrile, and as a more specific example, the ethylenically unsaturated nitrile-based monomer may be acrylonitrile.

A content of the ethylenically unsaturated nitrile-based monomer may be 18 wt % to 28 wt % based on the total content of the carboxylic acid-modified nitrile-based copolymer. Within this range, a formed article formed of the latex composition for dip-forming that contains the carboxylic acid-modified nitrile-based copolymer is soft and easily stretched and has improved rubber elasticity, as a content of the ethylenically unsaturated nitrile-based monomer is decreased.

(iii) Ethylenically Unsaturated Acid Monomer

In addition, according to an exemplary embodiment of the present invention, an ethylenically unsaturated acid monomer constituting the ethylenically unsaturated acid monomer-derived unit may be an ethylenically unsaturated monomer having an acid group such as a carboxyl group, a sulfonic acid group, or an acid anhydride group. As a specific example, the ethylenically unsaturated acid monomer may be one or more selected from the group consisting of an ethylenically unsaturated acid monomer such as acrylic acid, methacrylic acid, itaconic acid, maleic acid, or fumaric acid; polycarboxylic acid anhydride such as maleic acid anhydride or citraconic acid anhydride; an ethylenically unsaturated sulfonic acid monomer such as styrenesulfonic acid; and an ethylenically unsaturated polycarboxylic acid partial ester monomer such as monobutyl fumarate, monobutyl maleate, or mono-2-hydroxypropyl maleate. As a more specific example, the ethylenically unsaturated acid monomer may be one or more selected from the group consisting of acrylic acid, methacrylic acid, itaconic acid, maleic acid, and fumaric acid. As a still more specific example, the ethylenically unsaturated acid monomer may be methacrylic acid.

A content of the ethylenically unsaturated acid monomer-derived unit may be 2.5 wt % to 4.5 wt % based on the total content of the carboxylic acid-modified nitrile-based copolymer. Within this range, a formed article formed of the latex composition for dip-forming that contains the carboxylic acid-modified nitrile-based copolymer is soft and easily stretched and has improved rubber elasticity, as the content of the ethylenically unsaturated acid monomer-derived unit is decreased.

(iv) Ethylenically Unsaturated Monomer

The carboxylic acid-modified nitrile-based copolymer may optionally further include an ethylenically unsaturated monomer.

The ethylenically unsaturated monomer may include one Or more selected from the group consisting of a hydroxyalkyl (meth)acrylate monomer having 1 to 4 carbon atoms, a vinyl aromatic monomer, a fluoroalkyl vinyl ether monomer, an ethylenically unsaturated amide monomer, a non-conjugated diene monomer, and an ethylenically unsaturated carboxylic acid ester monomer.

A content of the ethylenically unsaturated monomer-derived unit may be 0.5 wt % to 5 wt % based on the total content of the carboxylic acid-modified nitrile-based copolymer. Within this range, it is possible to impart some properties of a formed article formed of the latex composition for dip-forming that contains the carboxylic acid-modified nitrile-based copolymer, such as a texture and comfort of wearing.

The features of the monomer composition of the carboxylic acid-modified nitrile-based copolymer of the present invention described above are achieved by optimizing the contents of the ethylenically unsaturated nitrile-based monomer and the ethylenically unsaturated acid monomer, such that a formed article formed of the carboxylic acid-modified nitrile-based copolymer latex is soft and easily stretched.

(v) Method for Producing Carboxylic Acid-Modified Nitrile-Based Copolymer

In the present invention, the carboxylic acid-modified nitrile-based copolymer latex may have features that have never been provided before by controlling the monomer composition of the copolymer and process elements of a preparation method exemplified below.

Specifically, first, a method for preparing the carboxylic acid-modified nitrile-based copolymer latex includes a polymerization step of adding a conjugated diene-based monomer, an ethylenically unsaturated nitrile-based monomer, and an ethylenically unsaturated acid monomer to a polymerization reactor and polymerizing the monomers.

The polymerization step is performed to form a main chain of a carboxylic acid-modified nitrile-based copolymer, and the polymerization is performed by emulsion polymerization. In this case, the respective monomers are first added to the polymerization reactor in the types and contents of the monomers described above, and the respective monomers may be separately added, added at the same time, or continuously added.

In the separation addition, the ethylenically unsaturated nitrile-based monomer, the conjugated diene-based monomer, or the ethylenically unsaturated nitrile-based monomer and the ethylenically unsaturated acid monomer are primarily added, and the other monomers may be secondarily added.

In addition, the respective monomers may be separately added over primary addition, secondary addition, and tertiary addition, and in this case, a distribution of the monomers according to a difference between reaction speeds of the respective monomers may be uniform. Therefore, a balance between physical properties of a formed article produced by using the carboxylic acid-modified nitrile-based copolymer may be improved.

In addition, the polymerization step may be performed by adding the monomers and starting stirring, and then adding an emulsifier, a polymerization initiator, an activator, a chain transfer agent, or the like.

As the emulsifier, one or more selected from the group consisting of an anionic surfactant, a nonionic surfactant, a cationic surfactant, and an amphoteric surfactant may be used. A specific example of the emulsifier includes alkyl benzene sulfonate (anionic surfactant), and specifically, sodium dodecyl benzene sulfonate may be used. In addition, the emulsifier may be added in an amount of 2 parts by weight to 4 parts by weight based on the total content of 100 parts by weight of the monomers to be added in the polymerization. In general, when the amount of the emulsifier is large, a particle diameter of a particle of the carboxylic acid-modified nitrile-based copolymer is reduced, resulting in an increase in stability.

As the polymerization initiator, a radical initiator may be used, and one or more selected from the group consisting of inorganic peroxide, organic peroxide, and a nitrogen compound may be used. As a specific example, the polymerization initiator may be inorganic peroxide, and as a more specific example, the polymerization initiator may be persulfate, for example, potassium persulfate. In addition, the polymerization initiator may be added in an amount of 0.1 parts by weight to 0.5 parts by weight based on the total content of 100 parts by weight of the monomers to be added in the polymerization step. Within this range, a polymerization speed may be maintained at an appropriate level.

Here, in a case where the organic peroxide or the inorganic peroxide is used as the polymerization initiator, the organic peroxide or the inorganic peroxide may be used in combination with a reducing agent. As the reducing agent, a compound containing metal ions in a reduced state, a sulfonic acid compound, and an amine compound may be used alone or in combination of two or more thereof.

In a case where the activator is used in the polymerization step, sodium formaldehyde sulfoxylate or the like may be used.

The amount of the activator added may be 0 parts by weight to 1 part by weight based on the total content of 100 parts by weight of the monomers to be added in the polymerization step. Within this range, the polymerization speed may be maintained at an appropriate level.

As the chain transfer agent, one or more selected from the group consisting of mercaptans, halogenated hydrocarbon, and a sulfur-containing compound may be used. As a specific example, the chain transfer agent may be mercaptans, and as a more specific example, the chain transfer agent may be t-dodecyl mercaptan.

The amount of the chain transfer agent added is, for example, 0.2 parts by weight to 0.9 parts by weight based on the total content of 100 parts by weight of the monomers to be added in the polymerization step. Within this range, a balance between physical properties of a formed article produced by using the carboxylic acid-modified nitrile-based copolymer may be further improved.

As a medium, water may be used, and as a specific example, deionized water may be used. In addition, during the polymerization, in order to secure polymerization easiness, additives such as a chelating agent, a dispersant, a pH adjuster, a deoxidizer, a particle size adjuster, an anti-aging agent, and an oxygen scavenger may be further added, if necessary.

In the polymerization step, additives such as an emulsifier, a polymerization initiator, a chain transfer agent, and a medium may be added to the polymerization reactor together with or separately from each other after the addition of the monomers. In a case where the monomers are added in advance before addition of the additives and stirring is performed, the composition and amount of the monomers dissolved in an aqueous phase at the beginning of the polymerization reaction are affected, which causes a change in molecular weight of the carboxylic acid-modified nitrile-based copolymer to be polymerized and a change in distribution of carboxyl groups in particles of the latex. In addition, in a case where the monomers are separately added, the additives may be separately added according to this. In this case, the distribution of the monomers according to the difference between the reaction speeds of the respective monomers may be easily controlled, and a balance between physical properties of a formed article produced by using the carboxylic acid-modified nitrile-based copolymer may be further improved.

The polymerization of the carboxylic acid-modified nitrile-based copolymer may be performed at a temperature of 5° C. to 60° C. When the temperature is in the above range, there is no problem with stability of the latex.

In addition, the polymerization of the carboxylic acid-modified nitrile-based copolymer may be performed by controlling a change in reaction pressure relative to an initial reaction pressure according to a polymerization conversion rate to be in a specific range.

Specifically, the reaction pressure at the initiation of the polymerization is in a range of 2.0 to 2.8 $kgf/cm^2$, and the reaction pressure when the polymerization conversion rate is 1 to 45% is controlled in a range of 15% or less of an increase amount of the pressure relative to the reaction pressure at the initiation of the polymerization. In particular, the reaction pressure when the polymerization conversion rate is 40% is in a range of 5 to 10% of the increase amount of the pressure relative to the reaction pressure at the initiation of the polymerization.

The reaction pressure when the polymerization conversion rate is 46 to 75% is controlled in a range of 5 to 70% of the increase amount of the pressure relative to the reaction pressure at the initiation of the polymerization. In particular, the reaction pressure when the polymerization conversion rate is 60% is in a range of 30% to 65% of the increase amount of the pressure relative to the reaction pressure at the initiation of the polymerization.

The reaction pressure until the polymerization is terminated after the polymerization conversion rate is 76% is controlled in a range of 0 to 5% of the increase amount of the pressure relative to the reaction pressure at the initiation of the polymerization or in a range of 0 to 100% of a decrease amount of the pressure relative to the reaction pressure at the initiation of the polymerization. In particular, the reaction pressure is adjusted so that the reaction pressure when the polymerization conversion rate is 90% is in a range of 10% or more of the decrease amount of the pressure relative to the reaction pressure at the initiation of the polymerization.

The polymerization conversion rate of the polymerization reaction may be measured by a method commonly known in the related art. For example, a predetermined amount of a sample is taken out from a reaction composition at a certain time interval, a solid content is measured, and then, a polymerization conversion rate is calculated by the following Expression 5.

[Math. 5]

[Expression 5]

$$\text{Polymerization conversion rate (\%)}=[\{(\text{parts by weight of added monomers and additives})\times\text{solid content (\%)}-(\text{parts by weight of additives added other than monomers})\}/(\text{total parts by weight of added monomers})]\times 100 \quad (5)$$

In Expression 5, a part(s) by weight is based on the total content of 100 parts by weight of the monomers to be added. A sectional polymerization conversion rate may be calculated by reflecting parts by weight of the monomers and additives added until a corresponding section.

When the change in reaction pressure relative to the initial reaction pressure according to the polymerization conversion rate is adjusted to be in the above range, the composition and amounts of the monomers dissolved in the aqueous phase during the polymerization reaction are affected depending on the reaction pressure, which affects an entanglement degree, release difficulties, or a branch structure of the carboxylic acid-modified nitrile-based copolymer to be polymerized.

The method for preparing the carboxylic acid-modified nitrile-based copolymer latex further includes a step of terminating the polymerization reaction and obtaining a carboxylic acid-modified nitrile-based copolymer latex. The polymerization reaction is terminated by cooling the polymerization system at the time when the polymerization conversion rate is 85% or more, or adding a polymerization terminator, a pH adjuster, or an antioxidant.

In addition, the method for preparing the carboxylic acid-modified nitrile-based copolymer latex may further include a step of removing unreacted monomers by a deodorization process after the reaction is terminated.

In the present invention, in order to implement excellent physical properties of a formed article, such as a rubber glove, in which a latex is crosslinked by a crosslinking agent described below by a dip-forming process so that the formed article is soft and easily stretched and has excellent rubber elasticity, the amounts of the ethylenically unsaturated nitrile-based monomer and the ethylenically unsaturated acid monomer are optimized in the composition of the monomers in the latex. In addition, the polymerization step is controlled to adjust the entanglement degree, the release difficulties, the branch structure, and the molecular weight of the carboxylic acid-modified nitrile-based copolymer, the distribution of the carboxyl groups in the particles of the latex, and the like, thereby optimizing a structure of the particle of the latex. The latex prepared as described above affects elastic and viscous properties of the formed article.

In a case where the carboxylic acid-modified nitrile-based copolymer of the present invention is crosslinked by a crosslinking agent thereafter, the latex has a structure in which the entanglement is excellent and is not easily released, such that the rubber elasticity, and a so-called stress retention rate are dramatically increased, which is preferable. In addition, in order to implement softness, easy stretching, and small changes in physical properties even after irradiation with γ-rays, it is preferable that the molecular weight of the copolymer is appropriate and the carboxyl groups distributed in the particles of the latex are optimized. Such a carboxylic acid-modified nitrile-based copolymer may be produced by the composition and the polymerization method of the copolymer described above. In the present invention, a numerical range of each parameter that satisfies the physical properties required by the present inventors is determined by using the following various parameters while adjusting the physical properties of the carboxylic acid-modified nitrile-based copolymer.

It is preferable that the carboxylic acid-modified nitrile-based copolymer latex satisfies both the following Expressions 3 and 4.

[Math. 6]

[Expression 3]

$$1.0\leq CV_0\leq 3.0\ \text{mm}^2/\text{s} \quad (3)$$

[Expression 4]

$$0.8\leq P\leq 1, P=CV_D/CV_0 \quad (4)$$

In Expression 3, $CV_0$ represents a capillary viscosity of the carboxylic acid-modified nitrile-based copolymer latex in a swollen state.

In Expression 4, $CV_0$ is as described above and $CV_D$ represents a capillary viscosity of the carboxylic acid-modified nitrile-based copolymer latex in a de-swollen state.

As such, various factors of the carboxylic acid-modified nitrile-based copolymer, such as the composition and the polymerization method, are controlled to adjust the capillary viscosity and a P value to a range of 1.0 to 3.0 $mm^2/s$ and a range of 0.8 to 1, respectively, such that viscous and elastic properties of a formed article formed of the latex composition for dip-forming that contains the carboxylic acid-modified nitrile-based copolymer may be optimized. Therefore, the formed article formed of the latex composition for dip-forming is flexible and has an excellent texture and comfort of wearing and excellent elasticity.

The capillary viscosity $CV_0$ in Expression 3 is a capillary viscosity measured at a state where the carboxylic acid-modified nitrile-based copolymer is swollen. In general, the capillary viscosity is used as a means for measuring a molecular weight of a non-crosslinked polymer. However, in the present invention, $CV_0$ represents a capillary viscosity measured in a state where the copolymer particles in the latex are swollen in a methyl ethyl ketone solvent, that is, a swollen state of the copolymer particles in the latex, unlike such a general capillary viscosity.

Therefore, through $CV_0$, information on factors affecting the molecular weight of the copolymer in the carboxylic acid-modified nitrile-based copolymer latex and the swelling by the methyl ethyl ketone solvent may be acquired, and among the information, in particular, information on the distribution of the carboxyl groups of the copolymer in the particles of the latex may be efficiently acquired. That is, since the carboxylic acid-modified nitrile-based copolymer latex satisfying the above range of $CV_0$ has an appropriate molecular weight of the copolymer and an appropriate distribution of the carboxyl groups of the copolymer in the particles of the latex, using the carboxylic acid-modified nitrile-based copolymer latex as a latex composition for dip-forming affects the optimization of viscous and elastic properties of the formed article, such that physical properties of a formed article, in particular, a formed article that is easily stretched and has excellent softness, may be implemented. In addition, when an epoxy crosslinking agent that binds to the carboxyl groups distributed in the particles of the latex is added at the time of preparing the latex composition for dip-forming, the physical properties are not changed even when sterilization by γ-rays is performed.

In addition, $CV_0$ may be measured under a condition of a pH of 8.2 to 9.2 using a methyl ethyl ketone (MEK) solvent with a Cannon-Fenske routine type (SI Analytics GmbH Type No. 52013) capillary viscometer.

Expression 4 will be described below.

In Expression 4, $CV_0$ is as described in Expression 3. In addition, $CV_D$ represents a capillary viscosity of the carboxylic acid-modified nitrile-based copolymer latex in a de-swollen state.

The de-swollen state refers to a state where a swollen portion of the particles of the copolymer in the latex in the methyl ethyl ketone solvent is removed. For example, a state where a portion of the particles of the copolymer dissolved in the methyl ethyl ketone solvent is removed by applying a predetermined energy to the particles of the copolymer in the latex in the swollen state may refer to the de-swollen state.

$CV_D$ may be a capillary viscosity measured by dissolving the carboxylic acid-modified nitrile-based copolymer latex in the methyl ethyl ketone solvent under a condition of a pH of 8.2 to 9.2, and then de-swelling the carboxylic acid-modified nitrile-based copolymer latex by applying an energy of 55 kcal to 65 kcal using an ultrasonicator (Bransonic (registered trademark) M Mechanical Bath 5800) for 40 minutes. In the case, the capillary viscosity may be measured in the same method as that in the measurement of $CV_0$ using the Cannon-Fenske routine type capillary viscometer.

In addition, P is specifically a ratio of the capillary viscosity of the carboxylic acid-modified nitrile-based copolymer latex in the de-swollen state to the capillary viscosity of the carboxylic acid-modified nitrile-based copolymer latex in the swollen state. P is 0.8 to 1. When P is as described above, information on the entanglement, the release difficulties, and the latex particle structure, such as a branch structure, of the copolymer in the carboxylic acid-modified nitrile-based copolymer latex may be acquired. In a case where a carboxylic acid-modified nitrile-based copolymer latex satisfying the above range of P has a latex particle structure in which an entanglement of a copolymer is appropriate and release of the copolymer is difficult, and is used in a latex composition for dip-forming, optimization of viscous and elastic properties of a formed article is affected, such that elasticity of the formed article, that is, a stress retention rate of the formed article, may be dramatically increased.

As described above, a latex is prepared while examining the numerical ranges of $CV_0$ and P, thereby completing the latex of the present invention. In a case where a latex composition for dip-forming is prepared using an epoxy crosslinking agent and an aluminum crosslinking agent, the properties of the latex may implement an aluminum ionic bonding and a degree of epoxy crosslinking may be optimally implemented. In addition, viscous and elastic properties of a formed article to be formed of the latex composition for dip-forming are optimized, such that the formed article is soft, and has excellent texture, comfort of wearing, and elasticity.

(2) Epoxy Crosslinking Agent

The epoxy crosslinking agent of the present invention has, for example, three or more glycidyl groups in one molecule, an alicyclic, aliphatic, or aromatic base skeleton, an average number of epoxy groups of more than 2.25, and an MIBK/water distribution ratio of 50% or more.

An epoxy compound is generally divided into monofunctional, bifunctional, and polyfunctional epoxy compounds. A crosslinking reaction occurs in bifunctional or higher epoxy crosslinking agents, and among them, an epoxy crosslinking agent having three or more glycidyl groups in one molecule and the base skeleton is referred to as a polyfunctional epoxy crosslinking agent.

Since bifunctional and monofunctional epoxy crosslinking agents are also simultaneously produced as by-products when preparing a polyfunctional epoxy crosslinking agent, the polyfunctional epoxy crosslinking agent is a mixture thereof except for a pure regent. Therefore, in the present invention, a polyfunctional epoxy crosslinking agent having an average number of epoxy groups of more than 2.25 may be used.

In addition, an average number of epoxy groups in the bifunctional epoxy crosslinking agent is about 1.5 to 1.8.

The average number of epoxy groups is obtained by identifying various epoxy compounds contained in the epoxy crosslinking agent by GPC, calculating the number of epoxy groups for each of the epoxy compounds by multiplying the number of epoxy groups in one molecule of each of the epoxy compounds by the number of moles of the epoxy compound, and dividing a total value of the numbers of epoxy groups by a total number of moles of all epoxy compounds contained in the epoxy crosslinking agent.

Examples of a polyfunctional epoxy crosslinking agent having three or more glycidyl groups in one molecule excluding by-products and an alicyclic, aliphatic, or aromatic base skeleton, that is, a so-called polyglycidyl ether having three or more glycidyl groups in one molecule, include glycerol triglycidyl ether, glycerol polyglycidyl ether, trimethylolpropane triglycidyl ether, trimethylolpropane polyglycidyl ether, trimethylolethane triglycidyl ether, sorbitol triglycidyl ether, sorbitol tetraglycidyl ether, sorbitol polyglycidyl ether, pentaerythritol triglycidyl ether, pentaerythritol tetraglycidyl ether, pentaerythritol polyglycidyl ether, and diglycerol triglycidyl ether.

In addition, the epoxy crosslinking agent of the present invention is, for example, an epoxy crosslinking agent having an average number of epoxy groups of more than 2.25 and an MIBK/water distribution ratio of 50% or more.

The MIBK/water distribution ratio is a ratio at which an epoxy crosslinking agent is distributed in methyl isobutyl ketone (MIBK) when the epoxy crosslinking agent is mixed with a mixed solution of water and MIBK having the same degree of hydrophobicity as that of a carboxylic acid-modified nitrile-based copolymer (hereinafter, referred to as XNBR).

The MIBK/water distribution ratio is more preferably 80% or more in the present invention.

In the present invention, a latex composition for dip-forming, that is, a so-called dipping liquid, is an alkaline water dispersion of XNBR particles. While an XNBR intraparticle environment is hydrophobic, an XNBR interparticle environment is hydrophilic. The environment is almost identical to an environment of the mixed solution of MIBK and water. A high MIBK/water distribution ratio means that the epoxy crosslinking agent is in more XNBR intraparticle hydrophobic regions and is stable. Meanwhile, the epoxy crosslinking agent in the hydrophilic region of the dipping liquid is deactivated in a relatively short time by rapid hydrolysis of the epoxy crosslinking agent under alkalinity of a pH of about 10.

In the related art, the epoxy crosslinking agent has been used for a water-based paint or a solvent-based paint, and since all of them performed crosslinking reactions in a relatively short time by evaporation, the above problems did not occur.

For example, in production of a glove by dip-forming, when the epoxy crosslinking agent is used while pouring and adding the dipping liquid to a dipping tank, a maturation time needs to be set to at least 3 days to prevent the epoxy crosslinking agent from being deactivated. Therefore, even in a case of a bifunctional epoxy crosslinking agent or a polyfunctional epoxy crosslinking agent, it is preferable an MIBK/water distribution ratio thereof is 27% or more in terms of dip-forming.

When the MIBK/water distribution ratio of the polyfunctional epoxy crosslinking agent is 50% or more, deactivation of the epoxy crosslinking agent in the XNBR particle is avoided, such that advantages of the epoxy crosslinking may be exhibited.

The epoxy crosslinking agent is used as a crosslinking agent that may be used in dip-forming by the above selection. The epoxy crosslinking has high fatigue durability. Meanwhile, it is required for the epoxy crosslinking to have a small contribution to a tensile strength and have strength by ionic crosslinking with zinc oxide.

The present invention focuses on the fact that most of the polyfunctional epoxy crosslinking agents having a high MIBK/water distribution ratio are contained in the particles of the latex, which are hydrophobic regions.

The epoxy crosslinking agent forms a covalent bond with buried carboxylic acid in the particle of the latex, which may increase an intraparticle crosslinking density and increase a stress retention rate of a finished film. To this end, it is premised on the fact that there is buried carboxylic acid that has a structure in which entanglement is not easily released due to an appropriate degree of entanglement like the particle of the latex of the present invention, and binds to the epoxy crosslinking agent in the particle.

Most of the carboxyl groups in the particle of the latex are present at an interface of the particles, and as a pH is increased, the carboxyl group is oriented outwardly to take a form of a carboxylate group. The carboxyl groups perform interparticle crosslinking with a metal crosslinking agent or a part of an epoxy crosslinking agent during curing.

Meanwhile, the carboxyl group in the particle is referred to as buried carboxylic acid, and the buried carboxylic acid that performs intraparticle crosslinking with the epoxy crosslinking agent is secured by the structure of the particle of the latex of the present invention. As described above, the latex of the present invention is subjected to epoxy crosslinking, such that a stress retention rate may be obtained.

The epoxy crosslinking agent may be recognized as a substitute for vulcanization by which butadiene forms a covalent bond with sulfur.

In addition, it is found that even in a case where XNBR that is particularly soft and easily stretched, such as the carboxylic acid-modified nitrile-based copolymer described above, is crosslinked by the epoxy crosslinking agent, a degree of inhibiting softness or stretching is lower than in a case using another crosslinking agent.

Furthermore, is it determined that since the epoxy crosslinking mainly implements sufficient intraparticle crosslinking, even when a product required to be sterilized, such as a surgical glove, is irradiated with γ-rays, changes in basic physical properties such as a tensile strength, an elongation, and a stress retention rate are small. This is considered to be due to the fact that the changes in physical properties due to formation of crosslinking at a butadiene portion in the particle by the irradiation with γ-rays are small by the sufficient intraparticle crosslinking by the intraparticle crosslinking with epoxy.

The amount of the epoxy crosslinking agent added is preferably 0.1 parts by weight or more and 1.6 parts by weight or less, and more preferably 0.2 parts by weight or more and 1.0 part by weight or less, based on 100 parts by weight of an elastomer, on the premise of a combination with a metal crosslinking agent. It is premised on the fact that the epoxy crosslinking agent mainly performs intraparticle crosslinking and buried carboxylic acid is present in the particle.

In addition, in examination of a preferred range of the added amount, an epoxy equivalent is also an important factor. A molecular weight of the epoxy compound per one epoxy group is called an epoxy equivalent, the epoxy equivalent (unit: g/eq.) is obtained by dividing the molecular weight by an average number of epoxy groups, and an equivalent of the epoxy crosslinking agent used in the present invention is in a range of 100 to 230 g/eq. Since the number of epoxy groups per unit weight differs depending on the type of the epoxy crosslinking agent, the original amount of the epoxy crosslinking agent added should be given on a molar basis, but in the present invention, it is based on a weight for convenience.

In a case of purchasing and obtaining the epoxy crosslinking agent according to an exemplary embodiment of the present invention, examples of a commercially available solvent-based epoxy crosslinking agent include products such as DENACOL Ex-314, Ex-321, Ex-411, and Ex-622 of Nagase ChemteX Corporation.

In addition, a polyfunctional epoxy crosslinking agent having a high MIBK/water distribution ratio according to the related art is often mainly used for an oil paint and is difficult to be dissolved in water. Therefore, it is preferable that the epoxy crosslinking agent is dissolved in a dispersant in advance before being added to the latex composition for dip-forming, which is a water/latex dispersion, and then the dissolved epoxy crosslinking agent is mixed with other constituent components of the latex composition for dip-forming. This is to quickly add the epoxy crosslinking agent to the entire particles of the latex.

Examples of the dispersant for the epoxy crosslinking agent include monohydric lower alcohol, glycol, glycol ether, and ester, and specifically, it is preferable to use methanol, ethanol, and diethylene glycol, and it is particularly preferable to use diethylene glycol in terms of volatility and flammability.

It is preferable that a weight ratio of the epoxy crosslinking agent to the dispersant in the latex composition for dip-forming is 1:4 to 1:1.

(3) Aluminum Crosslinking Agent

The aluminum crosslinking agent used in the present invention is preferably aluminum carboxylate. Examples of the aluminum carboxylate include aluminum glycolate, aluminum lactate, aluminum citrate, aluminum tartrate, aluminum malate, and aluminum gluconate. Among them, aluminum lactate is preferable because it has a low molecular weight, is eluted in water in a leaching step, and hardly remains in a glove.

Since a pH of the carboxylic acid-modified nitrile-based copolymer latex is generally about 8.5, when acidic aluminum carboxylate having a pH of 2 to 4 is added to the latex composition for dip-forming, in order to prevent coagulation of rubber components due to an acid shock of the latex, it is preferable to adjust the pH to 7.0 or more in advance with a pH adjuster, for example, a metal hydroxide compound such as potassium hydroxide or an aqueous ammonia solution.

The aluminum carboxylate may include at least hydroxy acid ions and aluminum ions, and may optionally include other compounds.

The aluminum carboxylate may be prepared by adding hydroxy acid or a salt thereof to an aluminum salt, aluminate, or a double salt thereof.

Examples of the aluminum salt include aluminum chloride hexahydrate, aluminum sulfate hexadecahydrate, and aluminum nitrate nonahydrate, examples of the aluminate include sodium aluminate and potassium aluminate, and examples of the double salt thereof include potassium sulfate aluminum dodecahydrate and ammonium sulfate aluminum dodecahydrate.

Since the aluminate has a strong basic pH level, an acid shock does not occur.

The hydroxy acid used for the reaction described above is a compound having at least an alcoholic hydroxyl group and a carboxyl group in one molecule, and may optionally have a substituent other than these groups. Examples of the hydroxy acid include glycolic acid, lactic acid, citric acid, tartaric acid, malic acid, gluconic acid, hydroxybutyric acid, hydroxyisobutyric acid, and hydroxypropionic acid.

The advantages of using the aluminum carboxylate of the present invention will be described below.

First, the use of the aluminum carboxylate prevents gelation in the weak alkali region of the aluminum crosslinking agent of the present invention to obtain stability, and enables the aluminum crosslinking agent to be stored for a long period of time and a dip-formed article to be produced using the same.

In general, since gelation (polymerization) of aluminum in water easily occurs in a weak alkali region (pH of 7.0 to 11.0), the aluminum crosslinking agent has stability problems during long-term storage or during a production process of a dip-formed article. However, in the aluminum carboxylate, the aluminum ions and the carboxyl ions (carboxylate) of the hydroxy acid are strongly bound to each other. Therefore, a gelation reaction may be prevented in terms of three-dimensionally protecting aluminum. In addition, the hydroxy acid has the alcoholic hydroxyl group, such that affinity of the aluminum carboxylate with water is improved. Therefore, the aluminum carboxylate is sufficiently dissolved and dispersed in water.

Second, since the aluminum carboxylate efficiently reacts with the carboxyl group included in the carboxylic acid-modified nitrile-based copolymer, a small amount of the aluminum carboxylate may be added, and elution to a leaching solution during the production may be suppressed.

In addition, the aluminum carboxylate may reduce an inflow of calcium that causes deterioration of rubber elasticity of the formed article into the formed article, such that the rubber elasticity of the formed article is improved. This is due to two types of reactions with the hydroxy acid and the carboxylate described below. An exchange reaction of the aluminum carboxylate with the hydroxy acid and the carboxylate of XNBR is performed in the latex composition for dip-forming at room temperature to form a crosslinked structure, resulting in a reduction of the elution of the aluminum carboxylate during the leaching step. In addition, since the carboxylate of XNBR is bound to aluminum in advance at the time of dipping in the latex composition for dip-forming, a reaction between coagulant-derived calcium and the carboxylate of XNBR is inhibited. The aluminum carboxylate forms a crosslinked structure with the carboxylic acid or carboxylate of XNBR during the curing step. In a case where the aluminum carboxylate contains hydroxide ions, a crosslink is formed by a dehydration reaction. In a case where the aluminum carboxylate contains unreacted hydroxy acid, the aluminum carboxylate reacts with carboxylate to form a crosslinked structure.

The carboxylate here may be a calcium salt, and may prevent calcium from being contained in the formed article.

Based on a molar ratio of the contained hydroxy acid ions to the aluminum ions, it may be determined that by which reaction of the two types of reactions the crosslinking reaction is more actively performed. When a molar ratio of the aluminum ions is 1, a molar ratio of the hydroxy acid ions is not particularly limited, and is preferably 0.5 or more and 3.0 or less.

Hereinafter, two types of crosslinking reactions will be described in detail.

(i) Crosslinking Reaction in Latex Composition for Dip-Forming

When the molar ratios of the aluminum ions and the hydroxy acid ions in the aluminum carboxylate are in the above-described ranges, hydroxy acid bound to aluminum may be present. In addition, some carboxylic groups of the carboxylic acid-modified nitrile-based copolymer are present as carboxylate groups at a surface of the particle of the carboxylic acid-modified nitrile-based copolymer latex, an exchange reaction between the carboxylic groups and the hydroxy acid ions of the aluminum carboxylate may be performed to form an aluminum crosslinking agent bound to a rubber molecular chain (see the following Formula 1).

[Chem. 1]

[Formula 1]

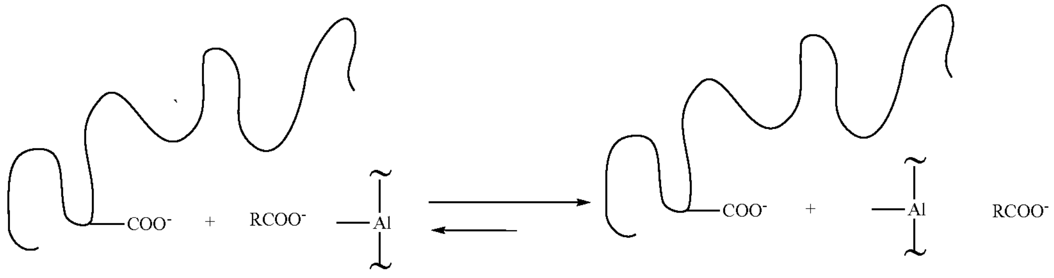

In the above formula, $RCOO^-$ represents a hydroxy acid ion.

As shown in Formula 1, it is assumed that the hydroxy acid bound to the aluminum compound is desorbed as a hydroxy acid ion, and the aluminum undergoes an exchange reaction that binds to carboxylate of XNBR. By this reaction, the aluminum compound forms a bond in XNBR. This reaction starts in the latex composition for dip-forming immediately after mixing the aluminum crosslinking agent with the XNBR latex and is completed at room temperature.

(ii) Crosslinking Reaction in Curing Step

When the molar ratios of the aluminum ions and the hydroxy acid ions in the aluminum carboxylate are in the above-described ranges, hydroxide ions are included in the aluminum crosslinking agent. Therefore, a crosslinked structure may also be formed by a reaction mechanism described below. A film is formed by performing a dip-forming method on the latex composition for dip-forming to which the aluminum crosslinking agent is added. The formed article is washed in the leaching step, such that water-soluble impurities in the film are eluted, a metal hydroxide compound or an ammonia compound is eluted, and the carboxylate group of XNBR is changed to a carboxyl group. The formed article is heated and dried in a crosslinking furnace in a subsequent curing step. During the curing step, a dehydration reaction of the carboxyl group of XNBR with the hydroxide ion of the aluminum crosslinking agent occurs, and the carboxyl group of XNBR binds to aluminum, thereby forming a crosslinked structure. This reaction is represented by Formula 2.

[Chem. 2]

[Formula 2]

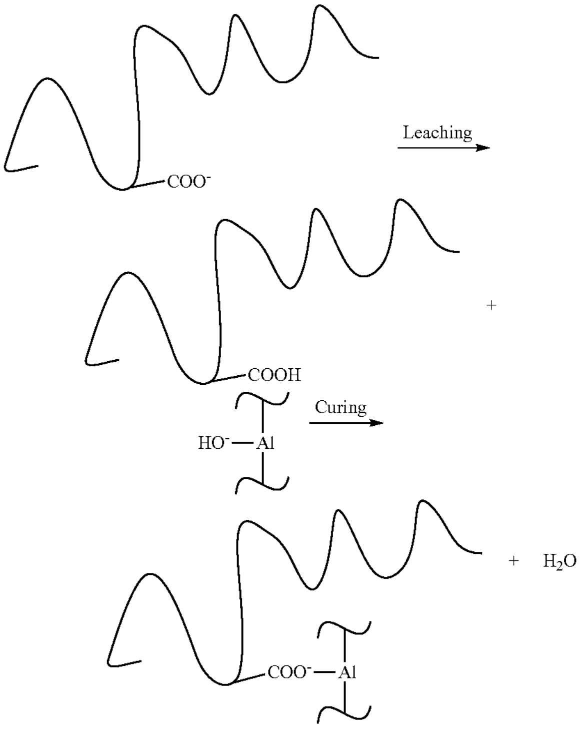

In addition, the aluminum carboxylate reacts with the calcium salt of carboxylic acid present during the curing to reduce calcium contained therein. Therefore, rubber elasticity of the formed article is improved. This reaction is represented by Formula 3.

[Chem. 3]

[Formula 3]

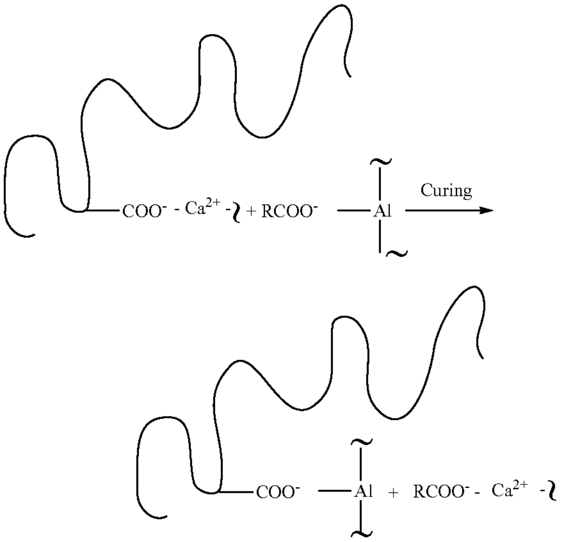

The aluminum crosslinking agent is stably used as a crosslinking agent that may be used in dip-forming by using the aluminum carboxylate. In dip-forming according to the related art, zinc oxide has been mainly used as a metal crosslinking agent. Zinc oxide has been used to mainly maintain strength of the formed article. On the other hand, recently, stability of an aluminum crosslinking agent in the latex composition for dip-forming is implemented. Therefore, the aluminum crosslinking agent is used as a substitute for zinc oxide. The aluminum carboxylate of the present invention is one of them. In the present invention, both the aluminum carboxylate and the epoxy crosslinking agent are used as crosslinking agents, instead of zinc oxide according to the related art. The reason that the aluminum carboxylate is used instead of zinc oxide will be described while comparing the characteristics of zinc crosslinking and aluminum crosslinking.

Either zinc crosslinking or aluminum crosslinking performs interparticle ionic bonding to maintain the strength of the formed article. However, since the zinc crosslinking has a binding strength weaker than that of aluminum, cleavage by an external force is easy and re-crosslinking with a separate carboxyl group is performed. Thus, a three-dimensional structure of the carboxylic acid-modified nitrile-based copolymer cannot be maintained, and rubber elasticity is deteriorated. On the other hand, since the aluminum crosslinking allows the particles to be more strongly bound to each other, a stress retention rate may be dramatically increased.

In addition, the aluminum carboxylate has the effect of reducing a content of calcium as described above. Therefore, the stress retention rate may be further improved. This is the reason that the aluminum crosslinking agent is used in the present invention.

Epoxy crosslinking is the same as the aluminum crosslinking in that it increases the stress retention rate, but differs from the aluminum crosslinking in that it increases an intraparticle crosslinking density in the intraparticle crosslinking to increase the stress retention rate.

Meanwhile, the aluminum crosslinking is the same as the zinc crosslinking in that it causes deterioration of softness or stretching of the formed article. Therefore, in order to obtain a formed article that is soft and easily stretched, the carboxylic acid-modified nitrile-based copolymer of the present invention that is soft and is easily stretched should be used.

In the formed article of the present invention, since the aluminum crosslinking agent is used, zinc oxide that is a hazardous heavy metal and has a large load on the natural environment or human body is replaced. Although zinc oxide is an excellent crosslinking agent, it has various problems such as a problem of disposal of waste leaching water during preparation, a problem of elution and transfer to foods or precision instruments during use, and a problem of disposal of ash when being wasted. Meanwhile, since aluminum is a light metal, has low toxicity, and is a common element in the human body and environment, it does not cause the problems as in the zinc oxide.

In addition, the aluminum crosslinking agent may improve fatigue durability unlike the zinc oxide. This is derived from the fact that the binding force of the ionic bonding between the aluminum ion and the carboxyl group is higher than the binding force between the zinc oxide and the carboxyl group.

It is considered that aluminum has a higher ionic bonding strength for forming a crosslinked structure according to Coulomb's law than zinc because aluminum has a larger valence and a shorter ionic radius than zinc. Therefore, in a case of an aluminum-crosslinked glove, the elution in artificial sweat is the smallest compared to a calcium- or zinc oxide-crosslinked glove. This means that the aluminum-crosslinked glove is the most resistant to sweat when being worn.

The amount of the aluminum crosslinking agent added to the latex composition for dip-forming in the present invention is expressed as the added amount in terms of aluminum oxide ($Al_2O_3$) represented by the following Expression 6. This is because it is important how many aluminum atoms are added to the aluminum crosslinking agent, and is to evaluate the effect of the aluminum crosslinking agent regardless of the content of hydroxy acid ions.

[Math. 7]

[Expression 6]

Added amount in terms of aluminum oxide (g)=actually added amount (g)×content of aluminum (% by mass)×molecular weight of aluminum oxide/aluminum atom amount×½ (6)

In the above expression, the content of aluminum is measured by ICP-AES.

In the latex composition for dip-forming of the present invention, the content of the aluminum crosslinking agent is preferably 0.1 parts by weight or more and 0.7 parts by weight, and more preferably 0.2 parts by weight or more and 0.7 parts by weight or less, in terms of aluminum oxide based on 100 parts by weight of the elastomer. When the content of the aluminum crosslinking agent is less than 0.1 parts by weight, sufficient interparticle crosslinking is not obtained, and the tensile strength of the formed article is deteriorated. In addition, when the content is more than 0.7 parts by weight, the effect of thickening the latex composition for dip-forming is too excessive, and the obtained formed article is hard and difficult to be stretched on contrary to the object of the present invention.

In a case of purchasing and obtaining the aluminum crosslinking agent according to an exemplary embodiment of the present invention, examples of a commercially available aluminum crosslinking agent include products such as Takiceram M-160L and AS800 of Taki Chemical Co., Ltd.

(4) Action Effect by Combination

Each of the latex, the epoxy crosslinking agent, and the aluminum crosslinking agent of the present invention has been described above.

Here, how to produce a formed article having softness and rubber elasticity will be described through a synergy effect obtained by analyzing the factors affecting the viscous and elastic properties of the formed article by SR modeling and implementing a complementary effect by combinations of the respective factors.

The SR modeling may be performed by the following method. SR may be obtained by preparing a dumbbell-shaped test piece according to a method of ASTM D-412, pulling the test piece at a cross-head speed of 300 mm/min using a measurement device U.T.M. (Instron, 3345 model) until an elongation reaches 100%, and measuring a stress reduction for 5 minutes. Then, here, the test piece is pulled until a magnification reaches 100%, load values at 0, 4, 9, 19, 29, 49, 89, 169, and 289 seconds are measured, and as a result thereof, a graph showing a load by time is obtained. $k_1$, $k_2$, and $k_3$ values may be obtained by fitting the graph obtained as described above using the Maxwell-Weichert model of Expression 7.

[Math. 8]

[Expression 7]

$$F(t)=k_1+k_2e^{-t/t2}+k_3e^{-t/t3} \quad (7)$$

F(t): load (N) by time, t: time (sec)

Final $k_1'$, $k_2'$, and $k_3'$ values may be obtained by dividing the $k_1$, $k_2$, and $k_3$ values obtained as described above by each thickness of the test piece, respectively, as shown in the following Expression 8.

[Math. 9]

$$k_1' \text{ (N/mm)}=k_1/\text{thickness of test piece (mm)}$$

$$k_2' \text{ (N/mm)}=k_2/\text{thickness of test piece (mm)} \quad (8)$$

$$k_3' \text{ (N/mm)}=k_3/\text{thickness of test piece (mm)}$$

The Maxwell-Weichert model of Expression 7 is a model in which one elastic body and two viscoelastic bodies are connected in parallel. Therefore, among the $k_1'$, $k_2'$, and $k_3'$ values obtained by dividing the $k_1$, $k_2$, and $k_3$ values obtained by data fitting the result obtained by the stress retention experiment by each thickness of the test piece using the Maxwell-Weichert model, $k_1'$ is an index related to elastic properties, and $k_2'$ and $k_3'$ are indices related to viscous properties.

Therefore, a formed article formed of a latex composition for dip-forming that contains a carboxylic acid-modified nitrile-based copolymer satisfying both the following Expressions 1 and 2 has optimized elastic and viscous properties, such that the formed article is soft and has excellent texture, comfort of wearing, and elasticity.

[Math. 10]

[Expression 1]

$$k_1'+k_2'+k_3' \leq 9.3\ \text{N/mm} \quad (1)$$

[Expression 2]

$$0.55 \leq k_1'/(k_1'+k_2'+k_3 \quad (2)$$

As described above, in the present invention, in a case where a latex having a structure in which an entanglement is maximized, release is difficult, and a degree of branching is high is prepared to be in a range of a latex in which a molecular weight of a copolymer and a distribution of carboxyl groups in particles of the latex are optimized by controlling a plurality of factors such as a composition and a polymerization method of the carboxylic acid-modified nitrile-based copolymer latex, and then, a latex composition for dip-forming is prepared using an aluminum crosslinking agent and an epoxy crosslinking agent, an aluminum ionic bonding and a degree of epoxy crosslinking are optimally realized.

The epoxy crosslinking agent mainly forms a covalent bond with buried carboxylic acid in the particles of the latex under the structure of the latex to increase an intraparticle crosslinking density. The aluminum crosslinking agent allows the particles to be firmly bound to each other under the structure of the latex to prevent a shift.

In addition, a degree of affecting elastic and viscous properties of the formed article produced using them varies due to a difference in binding method of these crosslinking agents. Therefore, the physical properties of the formed article vary depending on each crosslinking agent. That is, epoxy crosslinking is required to prevent loss of softness and stretching of the latex itself, and aluminum crosslinking is required to maintain a tensile strength and elasticity. This is because the tensile strength and elasticity are unstable when using only the epoxy crosslinking agent and the formed article is hard and shortened when using only the aluminum crosslinking agent. Therefore, an optimal crosslinking agent combination is required using both the epoxy crosslinking agent and the aluminum crosslinking agent. In a case where the epoxy crosslinking agent and the aluminum crosslinking agent are used in combination, when the total amount of two crosslinking agents added is, for example, 0.2 parts by weight or more and 1.6 parts by weight or less, and preferably 0.4 parts by weight or more and 1.4 parts by weight or less, this optimal crosslinking agent combination may be realized.

In addition, when a formed article is produced by using the latex that may realize these crosslinking agent combination and optimal degree of crosslinking, the formed article has optimal viscous and elastic properties satisfying both Expressions 1 and 2. Therefore, a glove having excellent elasticity satisfying the standard of a surgical glove may be produced.

A performance comparable to that of an XNBR glove according to the related art may be achieved with only the epoxy crosslinking agent or the aluminum crosslinking agent.

However, the interparticle strength is weak with only the epoxy crosslinking agent, and the intraparticle strength is weak with only the aluminum crosslinking agent. Therefore, the present inventors have presumed that an epoxy crosslinking and aluminum crosslinking model is optimal as a substitute for a vulcanization and zinc oxide-crosslinked glove model according to the related art. Furthermore, when a formed article is produced using the crosslinking model and the latex, in the best exemplary embodiment thereof, a glove that satisfies the standard for a surgical glove and has excellent rubber elasticity is produced.

In general, a surgical glove is sterilized by irradiation with γ-rays, but the present glove has a small change in physical properties even after being irradiated with γ-rays.

This is a difference from an only aluminum-crosslinked glove of which physical properties are significantly changed after being irradiated with γ-rays. The reason is that the intraparticle crosslinking is performed by epoxy crosslinking in the present glove. In addition, the epoxy crosslinking and aluminum crosslinking model has advantages in that Type IV allergic reactions caused in the related art due to a vulcanization accelerator of vulcanization are not caused, and zinc, which is a heavy metal, is not used.

2. Latex Composition for Dip-Forming

The latex composition for dip-forming of the present invention is a water dispersion containing at least the carboxylic acid-modified nitrile-based copolymer latex, the epoxy crosslinking agent, and the aluminum crosslinking agent described above, and water and a pH adjuster. The latex composition for dip-forming is used as a raw material for producing a formed article produced by dip-forming, such as a glove.

The latex composition for dip-forming is generally an aqueous emulsion in which water accounts for 60% or more (preferably 65 to 92 wt %).

It is preferable that the pH of the latex composition for dip-forming is adjusted to, for example, 9.0 to 10.5, by the pH adjuster and the respective solid contents are stirred to be almost uniformly dispersed.

Hereinafter, the pH adjuster and other components that may be generally contained in the latex composition for dip-forming will be described.

As the pH adjuster, an ammonium compound and hydroxides of an alkali metal may be used. Among them, potassium hydroxide (hereinafter, referred to as KOH) is most widely used because it is easy to adjust a pH.

The amount of the pH adjuster added may be about 0.1 to 4.0 parts by weight based on 100 parts by weight of the carboxylic acid-modified nitrile-based copolymer in the latex composition for dip-forming, and the pH adjuster is generally used in an amount of about 0.1 to 1.5 parts by weight.

The pH of the latex composition for dip-forming is adjusted to, for example, 9.0 to 11.0, and preferably 9.0 to 10.5. When the pH is 9.0 or more, the orientation of the carboxylate groups to the surface of the particle is sufficient, the amount of bonding by crosslinking is large, and the tensile strength is increased. On the other hand, when the pH is less than 11.0, the orientation of the carboxylate groups to the surface of the particle is appropriate, the amount of bonding by crosslinking is appropriate, and the softness and stretching are appropriate.

In addition, for example, when the pH is about 8.0, the stress retention rate is increased. As such, the pH is an important factor affecting the physical properties of the formed article.

The latex composition for dip-forming may further contain a dispersant. A preferred example of the dispersant includes an anionic surfactant, and more preferably, sulfonate is used.

A commercially available dispersant may be used. For example, "Tamol NN9104", which is a product of BASF SE, and the like may be used. A use amount thereof is preferably about 0.2 to 2.0 parts by weight based on 100 parts by weight of the elastomer in the latex composition for dip-forming.

The latex composition for dip-forming may further contain other various additives. Examples of the additive include an antioxidant, a pigment, and a chelating agent. As the antioxidant, a hindered phenol-type antioxidant, for example, WingstayL may be used. In addition, as the pigment, for example, titanium dioxide is used. As the chelating agent, sodium ethylenediaminetetraacetate and the like may be used.

In addition, the latex composition for dip-forming according to an exemplary embodiment of the present invention may be used for dip-forming of dip-formed articles, for example, medical goods such as a nursing bottle nipple, a dropper, a conduit, and a water pillow, toys and sporting equipment such as a balloon, a doll, and a ball, industrial articles such as a bag for press forming and a bag for gas storage, gloves and fingerstalls for surgical use, domestic use, agricultural use, fishery use, and industrial use, and a condom.

3. Production Method

The formed article of the present invention may be preferably produced by the following production method, the method including: (i) a maturation step of preparing and stirring a latex composition for dip-forming of the present invention;

(ii) a dipping step of dipping a forming mold in the latex composition for dip-forming;

(iii) a gelling step of gelling a film formed on the forming mold;

(iv) a leaching step of removing impurities from the film formed on the forming mold;

(v) a beading step of making a roll in a cuff portion; and (vi) a curing step of heating and drying the film at a high temperature and finally completing crosslinking to obtain a cured film as a formed article.

Hereinafter, each step will be described in detail by giving a glove as an example of a formed article.

(1) Coagulant Adhesion Step

A coagulant adhesion step is a step of adhering a coagulant to a glove forming mold.

A mold or former (glove forming mold) is dipped in a coagulant solution that contains a coagulant and $Ca^{2+}$ ions as a gelling agent in an amount of, for example, 5 to 40 wt %, and preferably 8 to 35 wt %. Here, a time for adhering the coagulant and the like to a surface of the mold or former is appropriately determined, and is generally about 10 to 20 seconds. As the coagulant, calcium nitrate or calcium chloride may be used. Another inorganic salt having an effect of causing an elastomer to precipitate may be used. Among them, it is preferable to use calcium nitrate. The coagulant is generally used in the form of an aqueous solution in which the coagulant is contained in an amount of 5 to 40 wt %.

In addition, it is preferable that the solution containing the coagulant contains potassium stearate, calcium stearate, mineral oil, or ester-based oil as a releasing agent in an amount of, for example, about 0.5 to 2 wt % or about 1 wt %.

Next, the mold or former to which the coagulant solution is adhered is placed in an oven at an internal temperature of 110° C. to 140° C. for 1 to 3 minutes to dry the coagulant solution, thereby adhering the coagulant to the entirety or a part of the glove forming mold. It should be noted that the glove forming mold has a surface temperature of 60° C. after the drying, which affects a subsequent reaction.

In addition, calcium not only functions as a coagulant for the formation of a film on the surface of the glove forming mold, but also contributes to crosslinking at a substantial portion of a finished glove.

In the present invention, in order to improve the physical properties of the glove, it is considered that excess calcium is not crosslinked, and the aluminum crosslinking agent may be used in place of calcium crosslinking.

(i) Maturation Step

The maturation step is a step of preparing and stirring a latex composition for dip-forming of the present invention.

When an epoxy crosslinking agent and an aluminum crosslinking agent are used as in the present invention, there is no meaning of a pre-crosslinking step for maturation as in the case of vulcanization according to the related art.

In the present invention, the present step is intended for dispersion and uniformity of the respective components of the latex composition for dip-forming.

In addition, the present step is also intended for adjustment of the pH of the latex composition for dip-forming to 9.0 to 10.5.

In an actual glove production process, the maturation is generally performed for 1 to 2 days, and a glove is produced while pouring the latex composition for dip-forming in a dipping tank from a compound tank.

To this end, it is important to stabilize the aluminum crosslinking agent without deactivating the epoxy crosslinking agent for at least 3 days, and preferably, for 5 days, while maintaining the pH.

(ii) Dipping Step

The dipping step is a step of dipping a glove forming mold in the latex composition for dip-forming.

The dipping step is a step of pouring the latex composition for dip-forming (dipping liquid) stirred in the maturation step according to an exemplary embodiment of the present invention in a dipping tank and dipping the mold or former to which the coagulant is adhered and dried in the coagulant adhesion step in the dipping tank under a temperature of 25 to 35° C. generally for 10 to 40 seconds.

In this step, the calcium ions contained in the coagulant cause the elastomer contained in the latex composition for dip-forming to aggregate on the surface of the mold or former to form a film.

(iii) Gelling Step

The gelling step is a step of gelling the film formed on the glove forming mold.

The gelling step is a step of gelling the film to a certain extent so that the film is not deformed in the leaching step, and is performed at 40° C. to 120° C. for about 1 minute 30 seconds to 4 minutes in a common production process. Double dipping is performed for a longer time. Heating may be performed in a gelling oven.

(iv) Leaching Step

The leaching step is a step of removing impurities from the film formed on the glove forming mold.

The leaching step is a step of washing and removing excess chemical agents and impurities that inhibit the subsequent curing, such as calcium precipitated on the surface of the film. In general, the former is rinsed in warm water at 30 to 70° C. for 1 to 4 minutes.

In the leaching step, the film is changed close to a neutral state from an alkaline state by the washing. Therefore, the carboxyl group in the particle and the carboxylate group oriented at an interface between the particles are returned to carboxyl groups. In addition, a ratio of the carboxyl groups inside and between the particles is determined here.

Meanwhile, the aluminum carboxylate bound to the carboxylate group does not flow out even after the washing. In addition, the surfactant, the coagulant-derived calcium, and the pH adjuster-derived potassium that causes deterioration of physical properties of a finished glove flow out more, as the washing is performed.

(v) Beading Step

The beading step is a step of making a roll in a cuff portion of a glove.

The beading step is a step of rolling a cuff portion of a glove subjected to the leaching step before crosslinking to make a ring having an appropriate thickness and thereby reinforce the cuff portion. When the beading step is performed in a wet state after the leaching step, adhesion of the rolled portion is excellent.

(vi) Curing Step

The curing step is a step of heating and drying the film at a high temperature and finally completing crosslinking to obtain a cured film as a glove.

There are cases where curing is performed in a plurality of drying furnaces and a temperature of the first drying furnace is slightly lowered. This is to prevent the quality from being damaged by formation of convex portions of a glove, such as blisters due to rapid evaporation of moisture. This step may be independently referred to as a pre-curing step. In this case, for example, the heating and the drying are performed at 60 to 90° C. for 30 seconds to 5 minutes.

Next, as the curing step, the heating and the drying are generally performed at 100 to 150° C. for 15 to 30 minutes.

In the curing step, interparticle crosslinking of XNBR is performed by OH of the carboxyl group and the aluminum carboxylate, and the carboxyl group in the particle of XNBR and the epoxy group are opened and crosslinking is performed. In addition, the crosslinking between the coagulant-derived calcium and the pH adjuster-derived potassium, and the carboxyl group is present in the glove.

(vi') Double Dipping

With regard to a glove production method, so-called single-dipping has been described above. On the other hand, the dipping step and the gelling step may be performed twice or more times, and this process is generally referred to as "double dipping".

Double-dipping is performed for the purpose of, for example, inhibiting the generation of pin-holes in production of a thick glove (having a thickness of about more than 200 to 300 μm) as well as in production of a thin glove.

As a point to be noted in double-dipping, for example, in order to allow the XNBR to aggregate in the second dipping step, a sufficient time is required in the first gelling step so as to cause calcium to sufficiently precipitate on the surface of the film.

4. Glove

The XNBR glove of the present invention is a glove having both high levels of softness and stretching and high stress retention rate (elasticity) even after crosslinking with a crosslinking agent, which are not exhibited in the XNBR glove according to the related art.

First, a copolymer having a structure in which an entanglement is maximized and difficulty in release is increased in a range of a latex in which a molecular weight of a copolymer and a distribution of carboxyl groups in particles of the latex are optimized by controlling various factors of the carboxylic acid-modified nitrile-based copolymer, such as the composition and the polymerization method, is produced. Crosslinking is performed by both the epoxy crosslinking agent that performs intraparticle crosslinking of the copolymer and the aluminum crosslinking agent that performs interparticle crosslinking to realize optimal aluminum ionic bonding and epoxy crosslinking, thereby achieving optimal viscous and elastic properties of the formed article.

As a result, in the best form of the finished glove, a glove that satisfies the standard of a surgical glove and has a high retention rate that has never been provided in the XNBR glove is obtained.

A surgical glove is generally required to be sterilized.

There are various standards (JIS, ASTM, and the like) for gloves according to various applications. In addition, a glove for medical use is also classified as a medical management device depending on the use thereof. Among them, sterilization is considered essential for a glove for surgical use, and there are some gloves required to be sterilized for pharmaceutical and dental uses. Sterilization is stipulated in the pharmaceutical method that the level of assurance of sterility should satisfy $SAL10^{-6}$ (one or no product to which viable bacteria are attached among one million products). Sterilization is generally performed by irradiation with γ-rays. The irradiation is performed at an absorbed dose of 25 kGy for about 3 hours.

Remarkably, the epoxy- and aluminum-crosslinked glove of the present invention has almost no changes in physical properties even after the irradiation with γ-rays is performed. In general, a substance irradiated with γ-rays is divided into a collapsed type and a crosslinked type. It is considered that in the case of XNBR, since butadiene has a double bond, crosslinking is easily formed at a double bond portion and physical properties such as hardening are easily changed when being irradiated.

For example, it is because in a case where intraparticle crosslinking is not performed as in only the aluminum crosslinking, the physical properties are significantly changed, and on the other hand, when the epoxy crosslinking agent that performs intraparticle crosslinking is used in combination, since the intraparticle crosslinking is formed in advance, the changes in physical properties are small. The characteristics of the glove whose physical properties are not changed by irradiation with γ-rays are preferable in terms of stability of the product.

Hereinafter, the present invention will be described in more detail with reference to Examples. However, the following Examples are provided for illustrating the present invention. It is apparent to those skilled in the art that various modifications and alterations may be made without departing from the scope and technical spirit of the present invention, and the scope of the present invention is not limited thereto.

EXAMPLES

Example 1

<Preparation of Carboxylic Acid-Modified Nitrile-Based Copolymer Latex>

Hereinafter, wt % indicates the total content of monomers to be added to form a main chain of a carboxylic acid-modified nitrile-based copolymer, and a part(s) by weight indicates the total of 100 parts by weight of the monomers to be added.

23 wt % of acrylonitrile and 3.5 wt % of methacrylic acid were added to a polymerization reactor provided with a stirrer and stirring was started to mix them, 0.6 parts by weight of t-dodecyl mercaptan, 4.0 parts by weight of sodium dodecyl benzene sulfonate, and 120 parts by weight of water were added, 73.5 wt % of 1,3-butadiene was added, and then, emulsion polymerization was initiated by adding 0.3 parts by weight of potassium persulfate as a polymerization initiator at a pressure of 2.5 kgf/$cm^2$ and a temperature of 40° C.

The reaction pressure when the polymerization conversion rate was 40% was controlled to 2.68 kgf/$cm^2$, the reaction pressure when the polymerization conversion rate was 60% was controlled to 3.55 kgf/$cm^2$, and the reaction pressure when the polymerization conversion rate was 90% was controlled to 1.25 kgf/$cm^2$.

When the polymerization conversion rate reached 94%, the polymerization was terminated. Thereafter, unreacted materials were removed by a deodorization process, and ammonium water, an antioxidant, and a defoaming agent were added, thereby obtaining a carboxylic acid-modified nitrile-based copolymer latex.

<Preparation of Latex Composition for Dip-Forming>

To 100 parts by weight (based on a solid content) of the obtained carboxylic acid-modified nitrile-based copolymer latex, 0.5 parts by weight of trimethylolpropane polyglycidyl ether (an epoxy crosslinking agent, DENACOL Ex-321 that was a product of Nagase ChemteX Corporation, epoxy equivalent of 140 g/eq., average number of epoxy groups of 2.7, MIBK/water distribution ratio of 87%) mixed with 0.5 parts by weight of diethylene glycol in advance was added. In addition, a pH of basic aluminum lactate (an aluminum crosslinking agent, M-160L that was a product of Taki Chemical Co., Ltd., an organic acid aluminum salt based on basic aluminum lactate represented by a composition formula $Al_5(OH)_{11}(CH_3CH(OH)COO)_4$ and a modified product thereof) was adjusted to 8.5, and then, 0.3 parts by weight of the basic aluminum lactate was added in terms of aluminum oxide. 1 part by weight of titanium oxide, a potassium hydroxide solution, and secondary distilled water were added thereto, thereby obtaining a latex composition for dip-forming having a solid content concentration of 22 wt % and a pH of 9.8 to 10.

<Production of Formed Article>

20 wt % of calcium nitrate, 79.5 wt % of water, and 0.5 wt % of a wetting agent (Huntsman Corporation, Teric 320) were mixed with each other to prepare a 20% coagulant solution. A hand-shaped ceramic mold was dipped in the solution for 10 seconds and taken out from the solution, and the hand-shaped ceramic mold was dried at 100° C. for 3 minutes, thereby applying a coagulant to the hand-shaped mold.

Subsequently, a ceramic plate to which the coagulant was applied was dipped in the obtained latex composition for dip-forming for 10 seconds and taken out from the latex composition, the ceramic plate was dried at 50° C. for 2 minutes, and the dried ceramic plate was dipped in warm water at 50° C. for 2 minutes. Next, the ceramic plate was preheated at 70° C. for 5 minutes and then was heated at 130° C. for 30 minutes to crosslink the latex. The crosslinked dip-formed layer was taken out from the ceramic plate to obtain a film-shaped formed article.

Example 2

27 wt % of acrylonitrile and 3.5 wt % of methacrylic acid were added to a polymerization reactor provided with a stirrer and stirring was started to mix them, 0.5 parts by weight of t-dodecyl mercaptan, 3.0 parts by weight of sodium dodecyl benzene sulfonate, and 120 parts by weight of water were added, 69.5 wt % of 1,3-butadiene was added, and then, emulsion polymerization was initiated by adding 0.24 parts by weight of potassium persulfate as a polymerization initiator at a pressure of 2.5 kgf/$cm^2$ and a temperature of 37° C.

The reaction pressure when the polymerization conversion rate was 40% was controlled to 2.70 kgf/$cm^2$, the reaction pressure when the polymerization conversion rate was 60% was controlled to 3.58 kgf/$cm^2$, and the reaction pressure when the polymerization conversion rate was 90% was controlled to 1.27 kgf/$cm^2$.

When the polymerization conversion rate reached 94%, the polymerization was terminated. Thereafter, unreacted materials were removed by a deodorization process, and ammonium water, an antioxidant, and a defoaming agent were added, thereby obtaining a carboxylic acid-modified nitrile-based copolymer latex.

A dip-formed article was produced by using the obtained latex in the same manner as that of Example 1.

Example 3

18 wt % of acrylonitrile and 4.5 wt % of methacrylic acid were added to a polymerization reactor provided with a stirrer and stirring was started to mix them, 0.3 parts by weight of t-dodecyl mercaptan, 3.0 parts by weight of sodium dodecyl benzene sulfonate, and 130 parts by weight of water were added, 77.5 wt % of 1,3-butadiene was added, and then, emulsion polymerization was initiated by adding 0.25 parts by weight of potassium persulfate as a polymerization initiator at a pressure of 2.7 kgf/$cm^2$ and a temperature of 40° C.

The reaction pressure when the polymerization conversion rate was 40% was controlled to 2.92 kgf/$cm^2$, the reaction pressure when the polymerization conversion rate was 60% was controlled to 4.27 kgf/$cm^2$, and the reaction pressure when the polymerization conversion rate was 90% was controlled to 1.76 kgf/$cm^2$.

When the polymerization conversion rate reached 96%, the polymerization was terminated. Thereafter, unreacted materials were removed by a deodorization process, and ammonium water, an antioxidant, and a defoaming agent were added, thereby obtaining a carboxylic acid-modified nitrile-based copolymer latex.

A dip-formed article was produced by using the obtained latex in the same manner as that of Example 1.

Example 4

28 wt % of acrylonitrile and 2.5 wt % of methacrylic acid were added to a polymerization reactor provided with a stirrer and stirring was started to mix them, 0.8 parts by weight of t-dodecyl mercaptan, 3.0 parts by weight of sodium dodecyl benzene sulfonate, and 110 parts by weight of water were added, 69.5 wt % of 1,3-butadiene was added, and then, emulsion polymerization was initiated by adding 0.35 parts by weight of potassium persulfate as a polymerization initiator at a pressure of 2.2 kgf/$cm^2$ and a temperature of 37° C.

The reaction pressure when the polymerization conversion rate was 40% was controlled to 2.38 kgf/$cm^2$, the reaction pressure when the polymerization conversion rate was 60% was controlled to 3.17 kgf/$cm^2$, and the reaction pressure when the polymerization conversion rate was 90% was controlled to 1.76 kgf/$cm^2$.

When the polymerization conversion rate reached 94%, the polymerization was terminated. Thereafter, unreacted materials were removed by a deodorization process, and ammonium water, an antioxidant, and a defoaming agent were added, thereby obtaining a carboxylic acid-modified nitrile-based copolymer latex.

A dip-formed article was produced by using the obtained latex in the same manner as that of Example 1.

Example 5

25 wt % of acrylonitrile and 4.1 wt % of methacrylic acid were added to a polymerization reactor provided with a stirrer and stirring was started to mix them, 0.3 parts by weight of t-dodecyl mercaptan, 2.5 parts by weight of sodium dodecyl benzene sulfonate, and 140 parts by weight of water were added, 70.9 wt % of 1,3-butadiene was added, and then, emulsion polymerization was initiated by adding 0.2 parts by weight of potassium persulfate as a polymerization initiator at a pressure of 2.4 $kgf/cm^2$ and a temperature of 40° C.

The reaction pressure when the polymerization conversion rate was 40% was controlled to 2.52 $kgf/cm^2$, the reaction pressure when the polymerization conversion rate was 60% was controlled to 3.12 $kgf/cm^2$, and the reaction pressure when the polymerization conversion rate was 90% was controlled to 0.24 $kgf/cm^2$.

When the polymerization conversion rate reached 96%, the polymerization was terminated. Thereafter, unreacted materials were removed by a deodorization process, and ammonium water, an antioxidant, and a defoaming agent were added, thereby obtaining a carboxylic acid-modified nitrile-based copolymer latex.

A dip-formed article was produced by using the obtained latex in the same manner as that of Example 1.

Example 6

21 wt % of acrylonitrile and 2.9 wt % of methacrylic acid were added to a polymerization reactor provided with a stirrer and stirring was started to mix them, 0.6 parts by weight of t-dodecyl mercaptan, 3.5 parts by weight of sodium dodecyl benzene sulfonate, and 110 parts by weight of water were added, 76.1 wt % of 1,3-butadiene was added, and then, emulsion polymerization was initiated by adding 0.3 parts by weight of potassium persulfate as a polymerization initiator at a pressure of 2.6 $kgf/cm^2$ and a temperature of 39° C.

The reaction pressure when the polymerization conversion rate was 40% was controlled to 2.86 $kgf/cm^2$, the reaction pressure when the polymerization conversion rate was 60% was controlled to 4.29 $kgf/cm^2$, and the reaction pressure when the polymerization conversion rate was 90% was controlled to 2.34 $kgf/cm^2$.

When the polymerization conversion rate reached 95%, the polymerization was terminated. Thereafter, unreacted materials were removed by a deodorization process, and ammonium water, an antioxidant, and a defoaming agent were added, thereby obtaining a carboxylic acid-modified nitrile-based copolymer latex.

A dip-formed article was produced by using the obtained latex in the same manner as that of Example 1.

Example 7

28 wt % of acrylonitrile and 4.5 wt % of methacrylic acid were added to a polymerization reactor provided with a stirrer and stirring was started to mix them, 0.25 parts by weight of t-dodecyl mercaptan, 3.0 parts by weight of sodium dodecyl benzene sulfonate, and 110 parts by weight of water were added, 67.5 wt % of 1,3-butadiene was added, and then, emulsion polymerization was initiated by adding 0.45 parts by weight of potassium persulfate as a polymerization initiator at a pressure of 2.0 $kgf/cm^2$ and a temperature of 36° C.

The reaction pressure when the polymerization conversion rate was 40% was controlled to 2.2 $kgf/cm^2$, the reaction pressure when the polymerization conversion rate was 60% was controlled to 2.6 $kgf/cm^2$, and the reaction pressure when the polymerization conversion rate was 90% was controlled to 1.8 $kgf/cm^2$.

When the polymerization conversion rate reached 97%, the polymerization was terminated. Thereafter, unreacted materials were removed by a deodorization process, and ammonium water, an antioxidant, and a defoaming agent were added, thereby obtaining a carboxylic acid-modified nitrile-based copolymer latex.

A dip-formed article was produced by using the obtained latex in the same manner as that of Example 1.

Example 8

18 wt % of acrylonitrile and 2.5 wt % of methacrylic acid were added to a polymerization reactor provided with a stirrer and stirring was started to mix them, 0.5 parts by weight of t-dodecyl mercaptan, 3.5 parts by weight of sodium dodecyl benzene sulfonate, and 120 parts by weight of water were added, 79.5 wt % of 1,3-butadiene was added, and then, emulsion polymerization was initiated by adding 0.15 parts by weight of potassium persulfate as a polymerization initiator at a pressure of 2.8 $kgf/cm^2$ and a temperature of 41° C.

The reaction pressure when the polymerization conversion rate was 40% was controlled to 2.94 $kgf/cm^2$, the reaction pressure when the polymerization conversion rate was 60% was controlled to 4.62 $kgf/cm^2$, and the reaction pressure when the polymerization conversion rate was 90% was controlled to 0.14 $kgf/cm^2$.

When the polymerization conversion rate reached 94%, the polymerization was terminated. Thereafter, unreacted materials were removed by a deodorization process, and ammonium water, an antioxidant, and a defoaming agent were added, thereby obtaining a carboxylic acid-modified nitrile-based copolymer latex.

A dip-formed article was produced by using the obtained latex in the same manner as that of Example 1.

Example 9

26 wt % of acrylonitrile and 4.0 wt % of methacrylic acid were added to a polymerization reactor provided with a stirrer and stirring was started to mix them, 0.6 parts by weight of t-dodecyl mercaptan, 3.5 parts by weight of sodium dodecyl benzene sulfonate, and 120 parts by weight of water were added, 70 wt % of isoprene was added, and then, emulsion polymerization was initiated by adding 0.3 parts by weight of potassium persulfate as a polymerization initiator at a pressure of 2.4 $kgf/cm^2$ and a temperature of 41° C.

The reaction pressure when the polymerization conversion rate was 40% was controlled to 2.57 $kgf/cm^2$, the reaction pressure when the polymerization conversion rate was 60% was controlled to 3.43 $kgf/cm^2$, and the reaction pressure when the polymerization conversion rate was 90% was controlled to 1.32 $kgf/cm^2$.

When the polymerization conversion rate reached 94%, the polymerization was terminated. Thereafter, unreacted materials were removed by a deodorization process, and ammonium water, an antioxidant, and a defoaming agent were added, thereby obtaining a carboxylic acid-modified nitrile-based copolymer latex.

A dip-formed article was produced by using the obtained latex in the same manner as that of Example 1.

COMPARATIVE EXAMPLES

Comparative Example 1

4.0 parts by weight of sodium dodecyl benzene sulfonate and 120 parts by weight of water were added to a polymerization reactor provided with a stirrer and stirring was started to mix them, 29 wt % of acrylonitrile, 5.0 wt % of methacrylic acid, and 0.6 parts by weight of t-dodecyl mercaptan were added, 66.0 wt % of 1,3-butadiene was added, and then, emulsion polymerization was initiated by adding 0.3 parts by weight of potassium persulfate as a polymerization initiator at a pressure of 2.5 kgf/cm$^2$ and a temperature of 40° C.

The reaction pressure when the polymerization conversion rate was 40% was controlled to 2.68 kgf/cm$^2$, the reaction pressure when the polymerization conversion rate was 60% was controlled to 3.55 kgf/cm$^2$, and the reaction pressure when the polymerization conversion rate was 90% was controlled to 1.25 kgf/cm$^2$.

When the polymerization conversion rate reached 94%, the polymerization was terminated. Thereafter, unreacted materials were removed by a deodorization process, and ammonium water, an antioxidant, and a defoaming agent were added, thereby obtaining a carboxylic acid-modified nitrile-based copolymer latex.

A dip-formed article was produced by using the obtained latex in the same manner as that of Example 1.

Comparative Example 2

25 wt % of acrylonitrile and 4.1 wt % of methacrylic acid were added to a polymerization reactor provided with a stirrer and stirring was started to mix them, 0.3 parts by weight of t-dodecyl mercaptan, 2.5 parts by weight of sodium dodecyl benzene sulfonate, and 140 parts by weight of water were added, 70.9 wt % of 1,3-butadiene was added, and then, emulsion polymerization was initiated by adding 0.2 parts by weight of potassium persulfate as a polymerization initiator at a pressure of 3.5 kgf/cm$^2$ and a temperature of 40° C.

The reaction pressure when the polymerization conversion rate was 40% was controlled to 4.06 kgf/cm$^2$, the reaction pressure when the polymerization conversion rate was 60% was controlled to 4.13 kgf/cm$^2$, and the reaction pressure when the polymerization conversion rate was 90% was controlled to 3.71 kgf/cm$^2$.

When the polymerization conversion rate reached 96%, the polymerization was terminated. Thereafter, unreacted materials were removed by a deodorization process, and ammonium water, an antioxidant, and a defoaming agent were added, thereby obtaining a carboxylic acid-modified nitrile-based copolymer latex.

A dip-formed article was produced by using the obtained latex in the same manner as that of Example 1.

Comparative Example 3

4.0 parts by weight of sodium dodecyl benzene sulfonate and 110 parts by weight of water were added to a polymerization reactor provided with a stirrer and stirring was started to mix them, 17 wt % of acrylonitrile, 2.0 wt % of methacrylic acid, and 0.25 parts by weight of t-dodecyl mercaptan were added, 81.0 wt % of 1,3-butadiene was added, and then, emulsion polymerization was initiated by adding 0.45 parts by weight of potassium persulfate as a polymerization initiator at a pressure of 3.3 kgf/cm$^2$ and a temperature of 41° C.

The reaction pressure when the polymerization conversion rate was 40% was controlled to 3.89 kgf/cm$^2$, the reaction pressure when the polymerization conversion rate was 60% was controlled to 5.68 kgf/cm$^2$, and the reaction pressure when the polymerization conversion rate was 90% was controlled to 3.03 kgf/cm$^2$.

When the polymerization conversion rate reached 97%, the polymerization was terminated. Thereafter, unreacted materials were removed by a deodorization process, and ammonium water, an antioxidant, and a defoaming agent were added, thereby obtaining a carboxylic acid-modified nitrile-based copolymer latex.

A dip-formed article was produced by using the obtained latex in the same manner as that of Example 1.

Comparative Example 4

4.0 parts by weight of sodium dodecyl benzene sulfonate and 120 parts by weight of water were added to a polymerization reactor provided with a stirrer and stirring was started to mix them, 29 wt % of acrylonitrile, 2.0 wt % of methacrylic acid, and 0.6 parts by weight of t-dodecyl mercaptan were added, 69.0 wt % of 1,3-butadiene was added, and then, emulsion polymerization was initiated by adding 0.3 parts by weight of potassium persulfate as a polymerization initiator at a pressure of 1.8 kgf/cm$^2$ and a temperature of 41° C.

The reaction pressure when the polymerization conversion rate was 40% was controlled to 2.02 kgf/cm$^2$, the reaction pressure when the polymerization conversion rate was 60% was controlled to 3.02 kgf/cm$^2$, and the reaction pressure when the polymerization conversion rate was 90% was controlled to 1.69 kgf/cm$^2$.

When the polymerization conversion rate reached 94%, the polymerization was terminated. Thereafter, unreacted materials were removed by a deodorization process, and ammonium water, an antioxidant, and a defoaming agent were added, thereby obtaining a carboxylic acid-modified nitrile-based copolymer latex.

A dip-formed article was produced by using the obtained latex in the same manner as that of Example 1.

Comparative Example 5

4.0 parts by weight of sodium dodecyl benzene sulfonate and 140 parts by weight of water were added to a polymerization reactor provided with a stirrer and stirring was started to mix them, 17 wt % of acrylonitrile, 5.0 wt % of methacrylic acid, and 0.25 parts by weight of t-dodecyl mercaptan were added, 78.0 wt % of 1,3-butadiene was added, and then, emulsion polymerization was initiated by adding 0.45 parts by weight of potassium persulfate as a polymerization initiator at a pressure of 1.7 kgf/cm$^2$ and a temperature of 36° C.

The reaction pressure when the polymerization conversion rate was 40% was controlled to 1.96 kgf/cm$^2$, the reaction pressure when the polymerization conversion rate was 60% was controlled to 2.16 kgf/cm$^2$, and the reaction pressure when the polymerization conversion rate was 90% was controlled to 1.65 kgf/cm$^2$.

When the polymerization conversion rate reached 97%, the polymerization was terminated. Thereafter, unreacted materials were removed by a deodorization process, and ammonium water, an antioxidant, and a defoaming agent were added, thereby obtaining a carboxylic acid-modified nitrile-based copolymer latex.

A dip-formed article was produced by using the obtained latex in the same manner as that of Example 1.

EXPERIMENTAL EXAMPLES

Experimental Example 1

Physical properties of the carboxylic acid-modified nitrile-based copolymer latex prepared in each of Examples and Comparative Examples were measured by the following method. The results are shown in Table 1.

(1) Capillary viscosity ($mm^2/s$, $CV_0$): A pH of each carboxylic acid-modified nitrile-based copolymer latex having a solid content of 44% to 46% was adjusted to 8.8 to 9.1 using 10% ammonium water, and then, the carboxylic acid-modified nitrile-based copolymer latex was dissolved in methyl ethyl ketone (MEK) at a concentration of 2.55 wt % to be uniformly dispersed. Next, 10 ml of the carboxylic acid-modified nitrile-based copolymer latex was injected into a Cannon-Fenske routine type (SI Analytics GmbH Type No. 52013) capillary viscometer, the time for the latex to pass through a capillary at 25° C. was measured, and a viscosity was calculated using the following Expression 9.

[Math. 11]

[Expression 9]

$$CV_0 = k \times t \quad (9)$$

In Expression 9, k is a constant ($mm^2/s^2$) of the capillary, and t is a time (s) for the latex to pass through the capillary.

(2) $CV_D$ ($mm^2/s$), P: A pH of each carboxylic acid-modified nitrile-based copolymer latex having a solid content of 44% to 46% was adjusted to 8.8 to 9.1 using 10% ammonium water, and then, the carboxylic acid-modified nitrile-based copolymer latex was dissolved in methyl ethyl ketone (MEK) at a concentration of 2.55 wt % to be uniformly dispersed. Next, de-swelling was performed by applying an energy of 55 kcal to 65 kcal using an ultrasonicator (Bransonic (registered trademark) M Mechanical Bath 5800) for 40 minutes, 10 ml of the carboxylic acid-modified nitrile-based copolymer latex was injected into the Cannon-Fenske routine type (SI Analytics GmbH Type No. 52013) capillary viscometer, the time for the copolymer latex to pass through the capillary at 25° C. was measured, and a viscosity was calculated using Mathematical Formula 1. In addition, P was measured by calculating $CV_D/CV_0$.

Physical properties of the formed article produced in each of Examples and Comparative Examples were measured by the following method. The results are shown in Table 1.

(3) Tensile strength (MPa): In accordance with a method of ASTM D-412, a test piece was pulled at a cross-head speed of 500 mm/min using a measurement device U.T.M. (a product of Instron, 3345 model), a point at which the test piece was cut was measured, and a tensile strength was calculated by the following Expression 10.

[Math. 12]

[Expression 10]

$$\text{Tensile strength (MPa)} = (\text{load value (kgf)})/(\text{thickness (mm)} \times \text{width (mm)}) \quad (10)$$

(4) Elongation (%): In accordance with a method of ASTM D-412, a test piece was pulled at a cross-head speed of 500 mm/min using a measurement device U.T.M. (a product of Instron, 3345 model), a point at which the test piece was cut was measured, and an elongation was calculated by the following Expression 11.

[Math. 13]

[Expression 11]

$$\text{Elongation (\%)} = ((\text{length after stretching test piece} - \text{initial length of test piece})/\text{initial length of test piece}) \times 100 \quad (11)$$

(5) 500% modulus (MPa): In accordance with a method of ASTM D-412, a test piece was pulled at a cross-head speed of 500 mm/min using a measurement device U.T.M. (a product of Instron, 3345 model), and a stress at an elongation of 500% was measured.

(6) Stress retention rate (%): In accordance with a method of ASTM D-412, a dumbbell-shaped test piece was prepared, the test piece was pulled at a cross-head speed of 300 mm/min using a measurement device U.T.M. (a product of Instron, 3345 model) until an elongation reached 100%, a stress reduction for 5 minutes was measured, and a stress retention rate was calculated according to the following Expression 12.

[Math. 14]

[Expression 12]

$$\text{Stress retention rate (\%)} = (\text{load value after 5 minutes of stretching of test piece})/\text{initial load value of stretching of test piece}) \times 100 \quad (12)$$

(7) $k_1'$, $k_2'$, $k_3'$ (N/mm)

In accordance with a method of ASTM D-412, a dumbbell-shaped test piece was prepared, the test piece was pulled at a cross-head speed of 300 mm/min using a measurement device U.T.M. (a product of Instron, 3345 model) until an elongation reached 100%, load values at 0, 4, 9, 19, 29, 49, 89, 169, and 289 seconds were measured, and as a result thereof, a graph showing a load by time was obtained. $k_1$, $k_2$, and $k_3$ values may be obtained by fitting the graph obtained as described above using the Maxwell-Weichert model (FIGS. 1 and 2). In FIG. 1, the square points represent load values at 0, 4, 9, 19, 29, 49, 89, 169, and 289 seconds, respectively, and a curve connecting the respective square points is a fitting line using the Maxwell-Weichert model.

[Math. 15]

[Expression 7]

$$F(t) = k_1 + k_2 e^{-t/t2} + k_3 e^{-t/t3} \quad (7)$$

F(t): load (N) by time, t: time (sec)

Finally, $k_1'$, $k_2'$, and $k_3'$ values may be obtained by dividing the $k_1$, $k_2$, and $k_3$ values obtained as described above by each thickness of the test piece, respectively, as shown in the following Expression 8.

[Math. 16]

[Expression 8]

$$k_1' \text{ (N/mm)} = k_1/\text{thickness of test piece (mm)}$$

$$k_2' \text{ (N/mm)} = k_2/\text{thickness of test piece (mm)} \quad (8)$$

$$k_3' \text{ (N/mm)} = k_3/\text{thickness of test piece (mm)}$$

TABLE 1

| | | Experimental Example/Comparative Experimental Example Experiment Example Experiment No. | | | | | | | |
|---|---|---|---|---|---|---|---|---|---|
| | | 1 | 2 | 3 | 4 | 5 | 6 | 7 | 8 |
| Used latex | | Example 1 | Example 2 | Example 3 | Example 4 | Example 5 | Example 6 | Example 7 | Example 8 |
| Added amount | BD (wt %) | 73.5 | 69.5 | 77.5 | 69.5 | 70.9 | 76.1 | 67.5 | 79.5 |
| | Isoprene (wt %) | | | | | | | | |
| | AN (wt %) | 23 | 27 | 18 | 28 | 25 | 21 | 28 | 18 |
| | MAA (wt %) | 3.5 | 3.5 | 4.5 | 2.5 | 4.1 | 2.9 | 4.5 | 2.5 |
| Physical properties of latex | $CV_0$ ($mm^2/s$) | 2.13 | 2.61 | 1.26 | 2.81 | 2.57 | 1.65 | 3.00 | 1.00 |
| | P | 0.92 | 0.84 | 0.92 | 0.88 | 0.80 | 0.98 | 0.81 | 0.96 |
| Crosslinking agent | Epoxy crosslinking agent (parts by weight) | 0.5 | 0.5 | 0.5 | 0.5 | 0.5 | 0.5 | 0.5 | 0.5 |
| | Al crosslinking agent (parts by weight) | 0.3 | 0.3 | 0.3 | 0.3 | 0.3 | 0.3 | 0.3 | 0.3 |
| Physical properties of formed article | $k_1' + k_2' + k_3'$ (N/mm) | 8.0 | 8.4 | 8.0 | 9.2 | 8.8 | 8.1 | 9.3 | 7.8 |
| | $k_1'/(k_1' + k_2' + k_3')$ | 0.58 | 0.58 | 0.61 | 0.59 | 0.55 | 0.63 | 0.56 | 0.61 |
| | Film thickness (mm) | 0.081 | 0.077 | 0.084 | 0.076 | 0.077 | 0.083 | 0.074 | 0.086 |
| | Tensile strength (MPa) | 21.1 | 25.0 | 24.5 | 18.4 | 24.3 | 18.3 | 27.5 | 17.3 |
| | Elongation (%) | 725 | 717 | 748 | 703 | 710 | 740 | 699 | 761 |
| | 500% MD (MPa) | 4.8 | 5.6 | 4.9 | 6.6 | 6.1 | 5.3 | 6.9 | 4.7 |
| | Stress retention rate (%) | 57.9 | 58.9 | 60.5 | 58.5 | 55.4 | 62.6 | 56.3 | 60.7 |

| | | Experimental Example/Comparative Experimental Example | | | | | |
|---|---|---|---|---|---|---|---|
| | | Experiment No. | | | | | |
| | | Experiment Example | Comparative Experimental Example | | | | |
| | | 9 | 10 | 11 | 12 | 13 | 14 |
| Used latex | | Example 9 | Comparative Example 1 | Comparative Example 2 | Comparative Example 3 | Comparative Example 4 | Comparative Example 5 |
| Added amount | BD (wt %) | | 66 | 70.9 | 81 | 69 | 78 |
| | Isoprene (wt %) | 70 | | | | | |
| | AN (wt %) | 26 | 29 | 25 | 17 | 29 | 17 |
| | MAA (wt %) | 4 | 5 | 4.1 | 2 | 2 | 5 |
| Physical properties of latex | $CV_0$ ($mm^2/s$) | 2.68 | 4.01 | 2.57 | 0.78 | 3.25 | 0.96 |
| | P | 0.86 | 0.86 | 0.70 | 0.78 | 0.76 | 0.72 |
| Crosslinking agent | Epoxy crosslinking agent (parts by weight) | 0.5 | 0.5 | 0.5 | 0.5 | 0.5 | 0.5 |
| | Al crosslinking agent (parts by weight) | 0.3 | 0.3 | 0.3 | 0.3 | 0.3 | 0.3 |
| Physical properties of formed article | $k_1' + k_2' + k_3'$ (N/mm) | 9.0 | 11.8 | 10.6 | 14.6 | 16.5 | 14.7 |
| | $k_1'/(k_1' + k_2' + k_3')$ | 0.58 | 0.58 | 0.42 | 0.45 | 0.44 | 0.43 |
| | Film thickness (mm) | 0.077 | 0.072 | 0.078 | 0.087 | 0.076 | 0.085 |
| | Tensile strength (MPa) | 24.1 | 29.4 | 24.3 | 15.5 | 19 | 23.8 |
| | Elongation (%) | 708 | 561 | 710 | 631 | 574 | 620 |
| | 500% MD (MPa) | 6.3 | 9.8 | 8.5 | 11.0 | 13.3 | 11.2 |
| | Stress retention rate (%) | 58.4 | 57.8 | 42.2 | 45 | 44 | 43.1 |

In the table, the following abbreviations were used.

BD: 1,3-butadiene

Isoprene: isoprene

AN: acrylonitrile

MAA: methacrylic acid

Referring to Table 1, in Experiments Nos. 1 to 9 in which the carboxylic acid-modified nitrile-based copolymer latex according to the present invention was used, it was confirmed that $CV_0$ was controlled to 1.0 $mm^2/s$ or more and 3.0 $mm^2/s$ or less, and P was 0.8 or more and 1 or less.

In comparison with these experiments, in Comparative Examples of Experiments Nos. 10 to 14, it was confirmed that any one of $CV_0$ and P was out of this range.

In addition, referring to Table 1, in the formed article dip-formed by preparing the latex composition for dip-forming in which the carboxylic acid-modified nitrile-based copolymer latex of the present invention having $CV_0$ of 1.0 $mm^2/s$ or more and 3.0 $mm^2/s$ or less and P of 0.8 or more and 1 or less, the aluminum crosslinking agent, and the epoxy crosslinking agent were contained, it was confirmed that $k_1'+k_2'+k_3'$ was 9.3 N/mm or less and $k_1'/(k_1'+k_2'+k_3')$ was 0.55 or more.

Referring to Table 1, in the dip-formed article having $k_1'+k_2'+k_3'$ of 9.3 N/mm or less and $k_1'/(k_1'+k_2'+k_3')$ of 0.55 or more according to the present invention, it was confirmed that the elasticity was excellent due to a high stress retention rate, and flexibility and comfort of wearing were excellent due to a low 500% modulus.

Experimental Example 2

In Experimental Example 2, a dip-formed article was produced in the same manner as that of Example 1, except that the use amounts of the carboxylic acid-modified nitrile-based copolymer latex (XNBR latex) prepared in each of Examples 5, 6, 7, and 8 of the present invention, the epoxy crosslinking agent, and the aluminum crosslinking agent were changed, and physical properties thereof were evaluated.

As for the crosslinking agents, the epoxy crosslinking agent or the aluminum crosslinking agent was used alone, or the epoxy crosslinking agent and the aluminum crosslinking agent of the present invention were used in combination, and the dip-formed article was produced while the amount of each crosslinking agent was changed. The type of the carboxylic acid-modified nitrile-based copolymer latex, the types and use amounts of the crosslinking agents, and the physical properties of the produced dip-formed article are shown in Table 2.

TABLE 2

| | | Experiment No. | | | | | | | | |
|---|---|---|---|---|---|---|---|---|---|---|
| | | 15 | 16 | 17 | 18 | 19 | 20 | 21 | 22 | 23 |
| Used latex | | Example 6 | Example 7 | Example 5 | Example 8 | Example 5 | Example 7 | Example 6 | Example 8 | Example 5 |
| Crosslinking agent | Epoxy crosslinking agent (parts by weight) | 0.2 | 0.5 | 1.0 | 0.7 | 1.6 | 0 | 0.075 | 1.0 | 1.5 |
| | Al crosslinking agent (parts by weight) | 0.2 | 0.3 | 0.2 | 0.5 | 0 | 0.2 | 0.075 | 0.7 | 0.2 |
| Physical properties of formed article | $k_1' + k_2' + k_3'$ (N/mm) | 8.2 | 9.3 | 9.2 | 8.5 | 8.7 | 9.1 | 7.8 | 9.5 | 9.5 |
| | $k_1'/(k_1' + k_2' + k_3')$ | 0.59 | 0.56 | 0.57 | 0.65 | 0.54 | 0.54 | 0.53 | 0.68 | 0.57 |
| | Tensile strength (MPa) | 17.5 | 27.5 | 24.8 | 21.1 | 19.2 | 24.1 | 13.3 | 24.5 | 26.0 |
| | Elongation (%) | 770 | 699 | 704 | 730 | 720 | 715 | 785 | 644 | 645 |
| | 500% MD (MPa) | 5.1 | 6.9 | 6.2 | 5.0 | 5.9 | 6.8 | 5.0 | 7.1 | 7.1 |
| | Stress retention rate (%) | 58.6 | 56.3 | 56.7 | 65.2 | 54.1 | 54.2 | 52.8 | 68.1 | 57.4 |

Referring to Table 2, in the dip-formed articles (Experiments Nos. 15 to 18) dip-formed using the latex composition for dip-forming in which appropriate amounts of both the epoxy crosslinking agent and the aluminum crosslinking agent of the present invention were contained, it was confirmed that $k_1'+k_2'+k_3'$ was 9.3 N/mm or less and $k_1'/(k_1'+k_2'+k_3')$ was 0.55 or more, which showed that the elasticity was excellent due to a high stress retention rate, and flexibility and comfort of wearing were excellent due to a low 500% modulus.

Experimental Example 3

In Experimental Example 3, physical properties of a dip-formed article produced by changing only the use amounts of the epoxy crosslinking agent and the aluminum crosslinking agent in Examples 2 of the present invention were evaluated. Furthermore, the physical properties of the dip-formed article irradiated with γ-rays were also measured. The use amounts of the crosslinking agents and the physical properties of the produced dip-formed article are shown in Table 3.

TABLE 3

| | | Experiment No. | | | | |
|---|---|---|---|---|---|---|
| | | 24 | 25 | 26 | 27 | 28 |
| Crosslinking agent | Epoxy crosslinking agent (parts by weight) | 0 | 0.5 | 0 | 0.3 | 0.5 |
| | Al crosslinking agent (parts by weight) | 0 | 0 | 0.5 | 0.3 | 0.3 |
| Physical properties of formed article | Tensile strength (MPa) | 9.2 | 14.1 | 19.0 | 20.4 | 25.0 |
| | Elongation (%) | 910 | 823 | 795 | 782 | 717 |
| | 500% MD(MPa) | 2.3 | 3.5 | 6.0 | 4.9 | 5.6 |
| | Stress retention rate (%) | 40.4 | 50.1 | 54.7 | 55.1 | 58.9 |
| | Durability (min) | 14 | ≥240 | ≥240 | ≥240 | ≥240 |
| Physical properties of formed article after irradiation with γ-rays | Tensile strength (MPa) | 10.8 | 15.3 | 22.5 | 21.3 | 25.1 |
| | Elongation (%) | 828 | 759 | 758 | 747 | 693 |
| | 500% MD(MPa) | 3.5 | 4.2 | 7.4 | 5.3 | 5.9 |
| | Stress retention rate (%) | 43.9 | 53.5 | 56.3 | 58.1 | 60.9 |
| | Durability (min) | ≥240 | ≥240 | ≥240 | ≥240 | ≥240 |

Experiment No. 24 is an example in which a crosslinking agent is not used, but actually exhibits the physical properties of the calcium-crosslinked dip-formed article. This is considered that these physical properties are the closest to those of the latex itself.

It can be seen from this that the latex is significantly easily stretched and soft from a starting point. It can be seen that the stress retention rate is more excellent than that of a general latex, but the latex itself does not have a particularly high stress retention rate. In addition, the tensile strength is significantly low.

When the dip-formed article is irradiated with γ-rays, the tensile strength and the stress retention rate are increased, the elongation is decreased, and the 500% modulus is increased. In addition, the fatigue durability is significantly increased. It can be appreciated from this that the physical properties of the film are significantly changed by the irradiation with γ-rays.

Next, the physical properties of the film of Experiment No. 25 in which only the epoxy crosslinking was performed and the film of Experiment No. 26 in which only the aluminum crosslinking was performed were confirmed. It could be seen from this that the tensile strength was excellent in the aluminum crosslinking and was poor in the epoxy crosslinking. In addition, it can be seen that, in the case of the epoxy crosslinking, softness and stretching of the latex itself are hardly damaged, and in the case of the aluminum crosslinking, the film is not stretched and hard more than that in the epoxy crosslinking. As for the stress retention rate, it can be seen that the stress retention rate of the latex itself is significantly increased by using any of the crosslinking agents. In addition, when the formed article is irradiated with γ-rays, in particular, in the case of the aluminum crosslinking, the formed article is harder than that in the case of the epoxy crosslinking. This indicates that the physical properties are deteriorated due to the irradiation with γ-rays in the aluminum crosslinking.

After confirming the above tendency, the physical properties of the films of Experiments Nos. 27 and 28 were confirmed by changing the amounts of the epoxy crosslinking agent and the aluminum crosslinking agent.

As a result, it was confirmed that all of the films were soft and easily stretchable formed articles unlike the XNBR glove according to the related art, and could be used as formed articles having a high stress retention rate.

Among them, as the best exemplary embodiment, the case where 0.5 parts by weight of the epoxy crosslinking agent and 0.3 parts by weight of the aluminum crosslinking agent are combined (Experiment No. 28) is preferable in terms of a balance between the physical properties. In addition, it could be appreciated that in the case of the best exemplary embodiment, there was no significant influence even after irradiation with γ-rays.

In the present invention, a formed article that have never been provided before was produced, the formed article having the original softness and stretching of the XNBR latex of the present invention, and further, a significantly high stress retention rate due to the appropriate entanglement structure of the XNBR latex of the present invention, and stable physical properties even after irradiation with γ-rays. In particular, in the best form, it could be seen that the XNBR glove satisfying the standard of a surgical glove was produced.

Experimental Example 4

A dip-formed article was produced in the same manner as that of Example 1, except that a latex composition for dip-forming having a solid content concentration of 30 wt % and a pH of 8 to 11 was used instead of the latex composition for dip-forming having a solid content concentration of 22 wt % and a pH of 9.8 to 10, and a 30% coagulant solution was used instead of the 20% coagulant solution. In addition, the 30% coagulant solution was prepared by mixing 30 wt % of calcium nitrate, 69.5 wt % of water, and 0.5 wt % of a wetting agent (Huntsman Corporation, Teric 320). A change of the pH was performed using potassium hydroxide or hydrochloric acid, if necessary. As the crosslinking agent, the epoxy crosslinking agent and the aluminum crosslinking agent were evenly added in amounts of 0.5 parts by weight. In addition, the thickness of the film of the formed article is shown in Table 4. The thickness of the film was increased as the pH was decreased. The pH of the latex composition for dip-forming and the physical properties of the obtained dip-formed article are shown in Table 4.

TABLE 4

| | | Experiment No. | | | | | | |
|---|---|---|---|---|---|---|---|---|
| | | 29 | 30 | 31 | 32 | 33 | 34 | 35 |
| | pH | 8.0 | 8.5 | 9.0 | 9.5 | 10.0 | 10.5 | 11.0 |
| Crosslinking agent | Epoxy crosslinking agent (parts by weight) | 0.5 | 0.5 | 0.5 | 0.5 | 0.5 | 0.5 | 0.5 |
| | Al crosslinking agent (parts by weight) | 0.5 | 0.5 | 0.5 | 0.5 | 0.5 | 0.5 | 0.5 |
| Film thickness of formed article (μm) | | 152 | 131 | 127 | 121 | 111 | 105 | 108 |
| Physical properties of formed article | Tensile strength (MPa) | 9.0 | 11.5 | 11.2 | 14.7 | 21.5 | 26.3 | 27.6 |
| | Elongation (%) | 959 | 895 | 803 | 772 | 737 | 683 | 667 |
| | 500% MD(MPa) | 2.47 | 3.03 | 3.84 | 4.72 | 6.49 | 9.50 | 11.01 |
| | Stress retention rate (%) | 57.7 | 61.7 | 61.2 | 58.2 | 54.8 | 52.3 | 50.2 |
| | Durability (min) | ≥240 | ≥240 | ≥240 | ≥240 | ≥240 | ≥240 | ≥240 |

Referring to Table 4, it could be confirmed that as for the physical properties of the dip-formed article, the tensile strength was increased as the pH of the latex composition for dip-forming was increased. In addition, the stretching of the dip-formed article was improved and the 500% modulus was decreased as the pH of the latex composition for dip-forming was decreased. As a result, the dip-formed article was softer. The stress retention rate of the dip-formed article was most excellent at the pH of 8.5 to 9.5. The balance of the physical properties of the dip-formed article was most excellent at the pH of 9.0 to 9.5 of the latex composition for dip-forming.

Experimental Example 5

In Experimental Example 5, each of dip-formed articles (Experiments Nos. 36 to 40) and dip-formed articles (Experiments Nos. 41 to 45) was irradiated with g-rays, and changes in physical properties thereof were confirmed, the dip-formed articles (Experiments Nos. 36 to 40) being produced in the same manner as that of Example 1, except that a latex composition for dip-forming having a solid content concentration of 30 wt % and a pH of 9.5 was used instead of the latex composition for dip-forming having a solid content concentration of 22 wt % and a pH of 9.8 to 10, a 30% coagulant solution was used instead of the 20% coagulant solution, and crosslinking was performed by 0.5 parts by weight of an epoxy crosslinking agent and 0.7 parts by weight of an aluminum crosslinking agent, and the dip-formed articles (Experiments Nos. 41 to 45) being produced in the same manner as those of Experiments Nos. 36 to 40, except that crosslinking was performed by 0.8 parts by weight of an epoxy crosslinking agent and 0.4 parts by weight of an aluminum crosslinking agent.

In these formed articles, the aluminum crosslinking agent and the epoxy crosslinking agent were used in combination, and in Experiments Nos. 36 to 40, the amount of the aluminum crosslinking agent was large, and in Experiments Nos. 41 to 45, the amount of the epoxy crosslinking agent was large.

A commercially available formed article of the present invention has physical properties that may be useful for a pharmaceutical glove and a surgical glove, but γ-ray sterilization is required to use them. In the γ-ray sterilization, it is important that the glove is not changed due to irradiation with γ-rays. Therefore, changes in physical properties of the formed article in an irradiation range of 0 to 100 kGy were confirmed. In addition, the pH of the dipping liquid was set to 9.5. The changes in physical properties of the formed article due to the irradiation with γ-rays are shown in Table 5.

TABLE 5

| | | Experiment No. | | | | | | | | | |
|---|---|---|---|---|---|---|---|---|---|---|---|
| | | 36 | 37 | 38 | 39 | 40 | 41 | 42 | 43 | 44 | 45 |
| Crosslinking agent | Epoxy crosslinking agent (parts by weight) | 0.5 | 0.5 | 0.5 | 0.5 | 0.5 | 0.8 | 0.8 | 0.8 | 0.8 | 0.8 |
| | Al crosslinking agent (parts by weight) | 0.7 | 0.7 | 0.7 | 0.7 | 0.7 | 0.4 | 0.4 | 0.4 | 0.4 | 0.4 |
| γ-ray irradiation dose (kGy) | Set value | 0 | 25 | 50 | 75 | 100 | 0 | 25 | 50 | 75 | 100 |
| | Measured value | 0 | 27.0-27.6 | 51.6-53.7 | 76.4-81.9 | 103-113 | 0 | 29.4-30.4 | 51.5-53.9 | 76.7-82.1 | 101-120 |
| Physical properties of formed article | Thickness (mm) | 0.118 | 0.115 | 0.115 | 0.116 | 0.118 | 0.116 | 0.118 | 0.116 | 0.118 | 0.117 |
| | Tensile strength (MPa) | 19.0 | 20.2 | 20.3 | 20.4 | 19.7 | 18.1 | 17.4 | 16.8 | 17.4 | 17.5 |
| | Elongation (%) | 741 | 697 | 677 | 636 | 575 | 701 | 679 | 641 | 602 | 560 |
| | 500% MD (MPa) | 6.56 | 7.90 | 8.37 | 10.03 | 12.56 | 6.52 | 6.68 | 7.69 | 8.94 | 11.40 |
| | Stress retention rate (%) | 60.8 | 60.0 | 60.9 | 60.4 | 62.5 | 62.5 | 61.7 | 64.7 | 63.4 | 65.1 |
| Changes in physical | Tensile strength (MPa) | 100.0 | 106.3 | 106.8 | 107.4 | 103.7 | 100.0 | 96.1 | 92.8 | 96.1 | 96.7 |

TABLE 5-continued

| | | Experiment No. | | | | | | | | | |
|---|---|---|---|---|---|---|---|---|---|---|---|
| | | 36 | 37 | 38 | 39 | 40 | 41 | 42 | 43 | 44 | 45 |
| properties of formed article due to γ-ray (%) | Elongation (%) | 100.0 | 94.1 | 91.4 | 85.8 | 77.6 | 100.0 | 96.9 | 91.4 | 85.9 | 79.9 |
| | 500% MD (MPa) | 100.0 | 120.4 | 127.6 | 152.9 | 191.5 | 100.0 | 102.5 | 117.9 | 137.1 | 174.8 |
| | Stress retention rate (%) | 100.0 | 98.7 | 100.2 | 99.3 | 102.8 | 100.0 | 98.7 | 103.5 | 101.4 | 104.2 |

The tendency in which the elongation was decreased according to the γ-ray irradiation dose, and the formed article was hard due to the increase in 500% modulus was the same in all the formed articles. In addition, the tensile strength and the stress retention rate were hardly changed. However, it could be seen that the change in each of elongation and 500% modulus was small in each of the formed articles of Experiments Nos. 41 to 45 in which the amount of the epoxy crosslinking agent was large.

In the case of an irradiation dose of 25 kGy for normal γ-ray sterilization, all the formed articles exhibit preferred physical properties even after irradiation. It could be seen that, as for the physical properties of two formed articles in the case of 25 kGy, the formed articles of Experiments Nos. 41 to 45 in which the epoxy crosslinking agent was used were softer. Other physical properties were almost the same in all the formed articles.

The invention claimed is:

1. A dip-formed article comprising a layer derived from a latex composition for dip-forming, the latex composition for dip-forming comprising:

an epoxy crosslinking agent, and a carboxylic acid-modified nitrile-based copolymer latex, the carboxylic acid-modified nitrile-based copolymer latex comprising a carboxylic acid-modified nitrile-based copolymer, the carboxylic acid-modified nitrile-based copolymer comprising, based on a dry weight of the carboxylic acid-modified nitrile-based copolymer:

18 to 28 wt % of an ethylenically unsaturated nitrile-based monomer-derived unit, 67.5 to 79.5 wt % of a conjugated diene-based monomer-derived unit, and 2.5 to 4.5 wt % of an ethylenically unsaturated acid monomer-derived unit, wherein an amount of the epoxy crosslinking agent added is 0.1 to 1.6 parts by weight based on 100 parts by weight of the carboxylic acid-modified nitrile-based copolymer, wherein the dip-formed article has an elongation of more than 650% and satisfies the following Expressions 1 and 2,

[Math. 17]

[Expression 1]

$$k_1'+k_2'+k_3' \leq 9.3 \text{ N/mm} \quad (1)$$

[Expression 2]

$$0.55 \leq k_1'/(k_1'+k_2'+k_3') \quad (2)$$

wherein $k_1'$ is a value obtained by dividing an equilibrium coefficient $k_1$ by a thickness of a test piece, and $k_2'$ and $k_3'$ are values obtained by dividing viscous coefficients $k_2$ and $k_3$ by the thickness of the test piece, respectively, and wherein the carboxylic acid-modified nitrile-based copolymer latex satisfies the following Expressions 3 and 4,

[Expression 3]

$$1.0 \leq CV_0 \leq 3.0 \text{ mm}^2/\text{s} \quad (3)$$

[Expression 4]

$$0.8 \leq P \leq 1, P=CV_D/CV_0 \quad (4)$$

wherein $CV_0$ represents a capillary viscosity of the carboxylic acid-modified nitrile-based copolymer latex in a swollen state, and $CV_D$ represents a capillary viscosity of the carboxylic acid-modified nitrile-based copolymer latex in a de-swollen state.

2. The dip-formed article of claim 1, wherein the latex composition for dip-forming further comprises an epoxy crosslinking agent, an aluminum crosslinking agent, water, and a pH adjuster.

3. The dip-formed article of claim 2, wherein the amount of the aluminum crosslinking agent added is 0.1 to 0.8 parts by weight in terms of aluminum oxide based on 100 parts by weight of the carboxylic acid-modified nitrile-based copolymer, and when both the epoxy crosslinking agent and the aluminum crosslinking agent are added, a total amount of the epoxy crosslinking agent and aluminum crosslinking agent added is 0.2 to 1.6 parts by weight based on 100 parts by weight of the carboxylic acid-modified nitrile-based copolymer.

4. The dip-formed article of claim 2, wherein the amount of the epoxy crosslinking agent added is 0.2 to 1.0 part by weight based on 100 parts by weight of the carboxylic acid-modified nitrile-based copolymer, the amount of the aluminum crosslinking agent added is 0.2 to 0.7 parts by weight in terms of aluminum oxide based on 100 parts by weight of the carboxylic acid-modified nitrile-based copolymer, and when both the epoxy crosslinking agent and the aluminum crosslinking agent are added, a total amount of the epoxy crosslinking agent and aluminum crosslinking agent added is 0.4 to 1.4 parts by weight based on 100 parts by weight of the carboxylic acid-modified nitrile-based copolymer.

5. The dip-formed article of claim 2, wherein the epoxy crosslinking agent has three or more glycidyl groups in one molecule, an alicyclic, aliphatic, or aromatic base skeleton, an average number of epoxy groups of more than 2.25, and an MIBK/water distribution ratio of 50% or more, and the aluminum crosslinking agent is aluminum carboxylate.

6. A latex composition for dip-forming, comprising: at least the carboxylic acid-modified nitrile-based copolymer latex of claim 1;

an epoxy crosslinking agent; and an aluminum crosslinking agent.

* * * * *